(12) United States Patent
Bran de León et al.

(10) Patent No.: US 12,724,217 B2
(45) Date of Patent: Sep. 1, 2026

(54) CONNECTION INTERFACES AND RELATED ASSEMBLIES

(71) Applicant: Outdoor Wireless Networks LLC, Claremont, NC (US)

(72) Inventors: Oscar F. Bran de León, Yuma, AZ (US); Thomas Marcouiller, Shakopee, MN (US)

(73) Assignee: Outdoor Wireless Networks LLC, Richardson, TX (US)

( * ) Notice: Subject to any disclaimer, the term of this patent is extended or adjusted under 35 U.S.C. 154(b) by 385 days.

(21) Appl. No.: 18/313,803

(22) Filed: May 8, 2023

(65) Prior Publication Data

US 2023/0408784 A1 Dec. 21, 2023

Related U.S. Application Data

(60) Provisional application No. 63/353,050, filed on Jun. 17, 2022.

(51) Int. Cl.
*G02B 6/44* (2006.01)
*G02B 6/38* (2006.01)
*H02G 3/08* (2006.01)

(52) U.S. Cl.
CPC ......... *G02B 6/4452* (2013.01); *G02B 6/3897* (2013.01); *G02B 6/4444* (2013.01); *H02G 3/083* (2013.01)

(58) Field of Classification Search
CPC .. G02B 6/4452; G02B 6/3897; G02B 6/4444; H02T 3/083
See application file for complete search history.

(56) References Cited

U.S. PATENT DOCUMENTS 5,042,901 A * 8/1991 Merriken ........... G02B 6/44465 385/135
5,684,911 A * 11/1997 Burgett .................. G02B 6/501 385/56

(Continued)

FOREIGN PATENT DOCUMENTS

EP 3700035 A1 8/2020
EP 3700035 B1 * 11/2023 ......... G02B 6/44465
WO WO-2020014210 A1 * 1/2020 ........... G02B 6/4471

OTHER PUBLICATIONS

"International Search Report and Written Opinion of the International Searching Authority", International Application No. PCT/US2023/021352, Aug. 31, 2023, 14 pp.

*Primary Examiner* — Peter Radkowski
(74) *Attorney, Agent, or Firm* — Myers Bigel, P.A.

(57) ABSTRACT

The present application is directed to a connection interface assembly. The assembly includes a base module including a back wall defining the back of the base module and first and second opposite side walls that project forwardly from the back wall to a front of the base module, a cable connection module configured to be inserted into a module mounting location through the front of the base module, the cable connection module having a main body coupled to or integral with a front wall to which a plurality of cable connection components are mounted, and an enclosure including a fiber tray and a cover that is configured to engage the cable connection module to form an interior cavity and seal the fiber tray therein. Other connection interface assemblies are described herein.

19 Claims, 22 Drawing Sheets

(56) References Cited

U.S. PATENT DOCUMENTS 5,734,776 A * 3/1998 Puetz .................. G02B 6/4442 385/134
5,825,963 A * 10/1998 Burgett ............. G02B 6/44465 385/101
7,013,074 B2 * 3/2006 Battey ................ G02B 6/44515 385/136
7,142,764 B2 * 11/2006 Allen ................. G02B 6/44528 385/134
7,298,952 B2 * 11/2007 Allen ................. G02B 6/44524 385/134
7,356,237 B2 * 4/2008 Mullaney ........... G02B 6/44515 385/135
7,418,183 B2 * 8/2008 Wittmeier ............ G02B 6/4442 385/134
7,428,366 B2 * 9/2008 Mullaney ............. G02B 6/3825 385/139
7,444,056 B2 * 10/2008 Allen .................. G02B 6/3878 385/139
7,748,911 B2 * 7/2010 Keenum ............ G02B 6/44528 385/76
7,751,675 B2 * 7/2010 Holmberg .......... G02B 6/44775 385/139
8,005,333 B2 * 8/2011 Mullaney ........... G02B 6/44775 174/50
8,050,528 B2 * 11/2011 Shimirak ............. H02G 15/013 174/77 R
8,111,966 B2 * 2/2012 Holmberg ............ G02B 6/4457 385/134
8,254,740 B2 * 8/2012 Smith ................ G02B 6/44775 385/135
8,275,228 B2 * 9/2012 Livingston ......... G02B 6/44528 398/41
8,472,775 B2 * 6/2013 Corbille ................. G02B 6/445 385/135
8,770,861 B2 * 7/2014 Smith ...................... G02B 6/36 385/76
8,837,894 B2 * 9/2014 Holmberg ............ G02B 6/4454 385/135
8,861,919 B2 * 10/2014 Alston ............... G02B 6/44528 385/99
8,886,003 B2 * 11/2014 Nieves ................. G02B 6/4446 385/95
8,929,708 B2 * 1/2015 Pimentel .............. G02B 6/4454 385/135
8,989,550 B2 * 3/2015 Allen ................... G02B 6/4454 385/135
9,057,858 B2 * 6/2015 Alston ................. G02B 6/3874
9,097,870 B2 * 8/2015 Torman .............. G02B 6/44528
9,223,094 B2 * 12/2015 Schneider ............ G02B 6/3885
9,223,106 B2 * 12/2015 Coan .................. G02B 6/44528
9,394,442 B2 * 7/2016 Adams .................. C08F 287/00
9,423,029 B2 * 8/2016 Coenegracht .......... H05K 5/061
9,442,266 B2 * 9/2016 Kowalczyk .......... G02B 6/4453
9,535,229 B2 * 1/2017 Ott ..................... G02B 6/44765
9,541,727 B2 * 1/2017 Torman .............. G02B 6/44528
9,557,504 B2 * 1/2017 Holmberg .......... G02B 6/44528
9,678,292 B2 * 6/2017 Landry .............. G02B 6/44524
9,736,957 B2 * 8/2017 Adams ................... H05K 5/065
9,766,414 B2 * 9/2017 Marcouiller ......... G02B 6/3825
9,837,754 B2 * 12/2017 Coenegracht .......... F16J 15/022
9,874,713 B2 * 1/2018 Marcouiller ............. G02B 6/00
9,885,845 B2 * 2/2018 Case .................. G02B 6/44528
10,031,307 B2 * 7/2018 Claessens ............ G02B 6/3897
10,033,463 B2 * 7/2018 Hubbard .......... H04B 10/25753
10,101,543 B2 * 10/2018 Marcouiller ......... G02B 6/3825
10,146,015 B2 * 12/2018 Zimmel ............... G02B 6/3871
10,268,012 B2 * 4/2019 Cams ................. H01R 13/5205
10,326,233 B2 * 6/2019 Coenegracht ...... H01R 13/5202
10,371,913 B2 * 8/2019 Claessens .............. G02B 6/445
10,422,970 B2 * 9/2019 Holmberg .......... G02B 6/44528
10,459,181 B2 * 10/2019 Claessens .......... G02B 6/44515
10,473,873 B2 * 11/2019 Diepstraten ........ G02B 6/44528
10,502,920 B2 * 12/2019 Coenegracht ........ G02B 6/4472
10,613,285 B2 * 4/2020 Case .................. G02B 6/44528
10,754,100 B2 * 8/2020 Elenbaas .............. G02B 6/3831
10,871,620 B2 * 12/2020 Marcouiller ............. G02B 6/48
10,886,659 B2 * 1/2021 Coenegracht ........ H05K 5/0095
10,890,730 B2 * 1/2021 Petersen ............ G02B 6/44715
10,942,318 B2 * 3/2021 Radelet .............. G02B 6/44715
10,944,155 B2 * 3/2021 Dickerson .............. H01Q 1/246
10,955,631 B2 * 3/2021 Claessens ............ G02B 6/4441
10,978,840 B2 * 4/2021 Paynter ............ H01R 13/62938
11,036,018 B2 * 6/2021 Holmberg ............ G02B 6/4454
11,038,261 B2 * 6/2021 Ai ......................... H01Q 1/246
11,092,765 B2 * 8/2021 Cams ................... G02B 6/4442
11,150,428 B2 * 10/2021 Geens ................ G02B 6/44526
11,226,460 B2 * 1/2022 Coenegracht ...... B65D 21/0224
11,262,520 B2 * 3/2022 Geens .................. G02B 6/3874
11,347,008 B2 * 5/2022 Lu ........................ G02B 6/3827
11,411,377 B2 * 8/2022 Bran .................... H02G 3/0456
11,460,657 B2 * 10/2022 Bishop ............... G02B 6/44524
11,555,975 B2 * 1/2023 Geens .................. G02B 6/4444
11,592,636 B2 * 2/2023 Holmberg ............ G02B 6/4457
11,635,577 B2 * 4/2023 Hill ...................... G02B 6/4471 385/53
11,644,631 B2 * 5/2023 Hill ...................... G02B 6/4454 385/135
11,870,229 B2 * 1/2024 Bran ....................... F16L 3/221
2003/0103750 A1 * 6/2003 Laporte .................. G02B 6/445 385/134
2004/0228598 A1 * 11/2004 Allen ................. G02B 6/44528 385/134
2005/0142925 A1 * 6/2005 Mugnaini ............ H01R 4/2491 439/411
2005/0175307 A1 * 8/2005 Battey .................... G02B 6/445 385/135
2006/0067636 A1 * 3/2006 Bludau ................ G02B 6/4453 385/135
2006/0133758 A1 * 6/2006 Mullaney ............. G02B 6/3897 385/139
2006/0269208 A1 * 11/2006 Allen ................. G02B 6/44515 385/135
2007/0036507 A1 * 2/2007 Allen ................. G02B 6/44528 385/134
2007/0183732 A1 * 8/2007 Wittmeier .......... G02B 6/44528 385/135
2007/0189694 A1 * 8/2007 Mullaney ........... G02B 6/44515 385/135
2008/0056645 A1 * 3/2008 Keenum ............ G02B 6/44528 385/58
2009/0202214 A1 * 8/2009 Holmberg .......... G02B 6/44528 385/136
2009/0290844 A1 * 11/2009 Mullaney ........... G02B 6/44465 385/135
2009/0304341 A1 * 12/2009 Shimirak ............. H02G 15/013 277/603
2009/0317047 A1 * 12/2009 Smith .................... H04B 10/25 385/134
2010/0104278 A1 * 4/2010 Livingston ........... G02B 6/4441 398/41
2011/0164853 A1 * 7/2011 Corbille ................. G02B 6/445 174/50.5
2011/0262095 A1 * 10/2011 Fabrykowski ......... G02B 6/475 385/135
2011/0268410 A1 * 11/2011 Giraud ............... G02B 6/44528 385/135
2012/0237173 A1 * 9/2012 Alston ................. G02B 6/2804 29/401.1
2013/0034333 A1 * 2/2013 Holmberg .......... G02B 6/44528 385/135
2013/0084050 A1 * 4/2013 Vastmans ............... H02G 15/10 361/679.01
2013/0089292 A1 * 4/2013 Ott ..................... G02B 6/44524 385/76
2013/0195417 A1 * 8/2013 Torman .................. G02B 6/444 29/428
2013/0243386 A1 * 9/2013 Pimentel .............. G02B 6/4477 385/135
2013/0294739 A1 * 11/2013 Allen ................... G02B 6/4454 385/135

(56) References Cited

U.S. PATENT DOCUMENTS

2014/0041893 A1* 2/2014 Adams .................. C08L 53/025
525/324
2014/0082913 A1* 3/2014 Marcouiller ......... G02B 6/3874
29/428
2014/0126870 A1* 5/2014 Landry ................ G02B 6/4457
385/135
2014/0219622 A1* 8/2014 Coan .................. G02B 6/44524
29/428
2014/0226937 A1* 8/2014 Elenbaas .............. G02B 6/3847
385/87
2014/0314381 A1* 10/2014 Adams .................... C08L 83/04
524/505
2015/0010278 A1* 1/2015 Alston ................. G02B 6/4442
385/135
2015/0153532 A1* 6/2015 Holmberg .......... G02B 6/44528
385/135
2015/0377355 A1* 12/2015 Coenegracht ........ G02B 6/4444
312/223.4
2015/0378112 A1* 12/2015 Marcouiller ............. G02B 6/00
385/56
2016/0077296 A1* 3/2016 Kowalczyk ............ G02B 6/445
385/135
2016/0124176 A1* 5/2016 Torman ............. G02B 6/44515
385/135
2016/0209614 A1* 7/2016 Case .................. G02B 6/44528
2016/0223759 A1* 8/2016 Marcouiller ......... G02B 6/4444
2016/0238810 A1* 8/2016 Hubbard .......... H04B 10/25753
2016/0313525 A1* 10/2016 Fletcher ............... G02B 6/4453
2017/0012382 A1* 1/2017 Coenegracht ........ H05K 5/0095
2017/0045701 A1* 2/2017 Diepstraten ............ G02B 6/445
2017/0176701 A1* 6/2017 Claessens ............ G02B 6/4454
2017/0227719 A1* 8/2017 Zimmel ............... G02B 6/3879
2017/0235067 A1* 8/2017 Holmberg .......... G02B 6/44528
385/135
2017/0373378 A1* 12/2017 Dickerson .............. H01Q 1/246
2018/0045906 A1* 2/2018 Cams ................ H01R 13/5202
2018/0088287 A1* 3/2018 Marcouiller ......... G02B 6/3879
2018/0120518 A1* 5/2018 Marcouiller ........... G02B 6/428
2018/0329162 A1* 11/2018 Claessens .......... G02B 6/44526
2018/0341072 A1* 11/2018 Marcouiller ......... G02B 6/4472
2018/0372978 A1* 12/2018 Wentworth ........ G02B 6/44526
2019/0041596 A1* 2/2019 Case ................. G02B 6/44528
2019/0041597 A1* 2/2019 Marcouiller ......... G02B 6/4457
2019/0107681 A1* 4/2019 Claessens ............ G02B 6/4454
2019/0170961 A1* 6/2019 Coenegracht ........ G02B 6/4444
2019/0204524 A1* 7/2019 Petersen ............ G02B 6/44715
2019/0312394 A1* 10/2019 Paynter ................ H01R 25/003
2019/0353854 A1* 11/2019 Radelet ................ G02B 6/3879
2020/0103608 A1* 4/2020 Hill ...................... G02B 6/4444
2020/0110234 A1* 4/2020 Holmberg .......... G02B 6/44528
2020/0124810 A1* 4/2020 Claessens .......... G02B 6/44526
2020/0200982 A1* 6/2020 Dowling ............ G02B 6/44465
2020/0220251 A1* 7/2020 Ai ........................ H01Q 19/108
2020/0257057 A1* 8/2020 Lu ...................... G02B 6/44515
2020/0271882 A1* 8/2020 Geens ................ G02B 6/44465
2020/0319420 A1* 10/2020 Cams ................... G02B 6/4454
2021/0026088 A1* 1/2021 Geens ...................... G09F 3/205
2021/0141180 A1* 5/2021 Coenegracht ...... G02B 6/44465
2021/0141185 A1* 5/2021 Geens .................. G02B 6/3891
2021/0208342 A1* 7/2021 Hill ...................... G02B 6/4471
2021/0218233 A1* 7/2021 Bran De León ... G02B 6/44528
2021/0271043 A1* 9/2021 Geens ................ G02B 6/44528
2021/0341697 A1* 11/2021 Bishop ................. G02B 6/4454
2022/0011530 A1* 1/2022 Holmberg ............ G02B 6/4457
2022/0368117 A1* 11/2022 Bran De León ........ F16L 3/221
2023/0280562 A1* 9/2023 Holmberg ............ G02B 6/4454
220/4.02

* cited by examiner 250
225
224
227
228
222
221a
221
226
223
222b
221a
223a
233a
233
220
221
222r
231

237
231a
230
256
252
232
250

CONNECTION INTERFACES AND RELATED ASSEMBLIES

RELATED APPLICATION(S)

The present application claims priority from and the benefit of U.S. Provisional patent application Ser. No. 63/353,050, filed Jun. 17, 2022, the disclosure of which is hereby incorporated herein in its entirety.

FIELD

The present invention relates to telecommunications equipment, and in particular, connection interfaces suitable for managing cables and related assemblies.

BACKGROUND

Antenna towers are increasingly used in communications network to provide cellular or other wireless services. Remote radio heads (RRH) coupled to or integrated with the antennas at the top of the towers transmit signals through the antennas. See, e.g., FIG. 2. Typically, a feeder cable is routed up the tower to the RRH from a network base station at the bottom of the tower. The feeder cable carries transmission signals and optionally power between the base station and the RRH.

Increasingly, the antenna towers are part of a Fiber to the Antenna (FTTA) network—the feeder cable is an optical cable including optical fibers carrying optical signals to the RRH. In some cases, each RRH receives a separate feeder cable (e.g., a hybrid cable). In certain cases, each RRH receives a separate signal feeder cable (e.g., an optical cable) and a separate power cable (e.g., a coaxial cable). In other cases, a common cable (e.g., a hybrid cable) can be routed up the tower and separated near the top of the tower into pigtails or additional cables routed to the respective RRH.

FIG. 1 illustrates a known connection interface assembly 100 suitable for use in managing cables on an antenna tower in a FTTA network. Some exemplary connection interface assemblies are shown and described in U.S. Patent Publication No. 2021/0218233 to Bran de Leon et al., the disclosure of which is hereby incorporated herein by reference in its entirety. As shown in FIG. 1, the assembly includes multiple bracket modules 170 that may be stacked together to form a base bracket 110. Each bracket module 170 is configured to receive a cable connection module 130. A plurality of cable connection components 150 is mounted on the cable connection module 130. The cable connection components may include fiber optic adapters 152 which each include a first end for mating with a first fiber optic connector 154 and a second end for mating with a second fiber optic connector 154. In addition, each bracket module 170 includes a respective mechanism 121 for attaching the module 170 to another structure 120 such as a pole, wall, rail, or other surface. Improvements to connection interface assemblies for use in a FTTA network may be desired.

SUMMARY

A first aspect of the present invention is directed to a connection interface assembly. The assembly includes a base module, a connection module, and an enclosure. The base module has a front and a back and includes a back wall defining the back of the base module and first and second opposite side walls that project forwardly from the back wall to a front of the base module. The base module defines a module mounting location between the first and second side walls. The cable connection module has a main body coupled to or integral with a front wall to which a plurality of cable connection components are mounted. The cable connection module also includes first and second opposite side walls that project rearwardly from the front wall. The cable connection module is configured to be inserted into the module mounting location through the front of the base module. The enclosure includes a fiber tray and a cover. The cover is configured to engage the cable connection module to form an interior cavity and seal the fiber tray therein.

Another aspect of the present invention is directed to a connection interface assembly. The assembly includes a base module, a cable connection module, and an extension cover. The base module has a front and a back and includes a back wall defining the back of the base module and first and second opposite side walls that project forwardly from the back wall to a front of the base module. The base module defines a module mounting location between the first and second side walls. The cable connection module has a main body coupled to or integral with a front wall to which a plurality of cable connection components are mounted. The cable connection module also includes first and second opposite side walls that project rearwardly from the front wall. The cable connection module is configured to be inserted into the module mounting location through the front of the base module. The extension cover includes a top member and a bottom member. The top and bottom members are configured to cooperate together to form an inner cavity sized and configured to contain the cable connection components that extend outwardly from the cable connection module when the top and bottom members are joined together.

Another aspect of the present invention is directed to a connection interface assembly. The assembly includes a base module, a cable connection module, and a mounting bracket assembly. The base module has a front and a back and includes a back wall defining the back of the base module and first and second opposite side walls that project forwardly from the back wall to a front of the base module. The base module defines a module mounting location between the first and second side walls. The cable connection module has a main body coupled to or integral with a front wall to which a plurality of cable connection components are mounted. The cable connection module also includes first and second opposite side walls that project rearwardly from the front wall. The cable connection module is configured to be inserted into the module mounting location through the front of the base module. The mounting bracket assembly is configured to secure the base module and a cable connection module to a mounting structure. The mounting bracket assembly includes a main bracket body and one or more attachment mechanisms. The main bracket body includes a plurality of protruding members extending outwardly therefrom, each protruding member configured to engage a corresponding aperture defined in the back wall of the base module.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
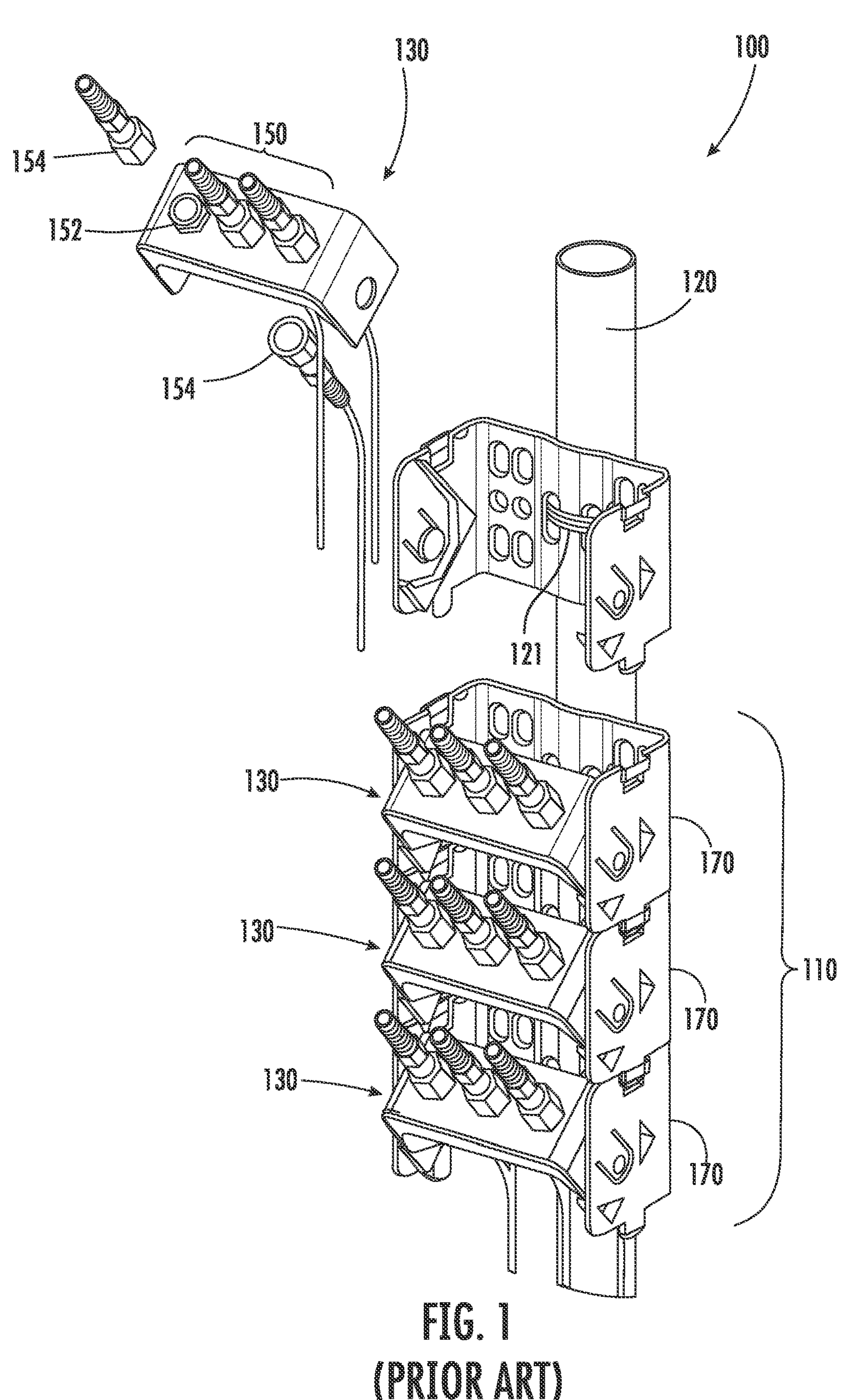
FIG. 1 is a schematic representation of a known connection interface.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
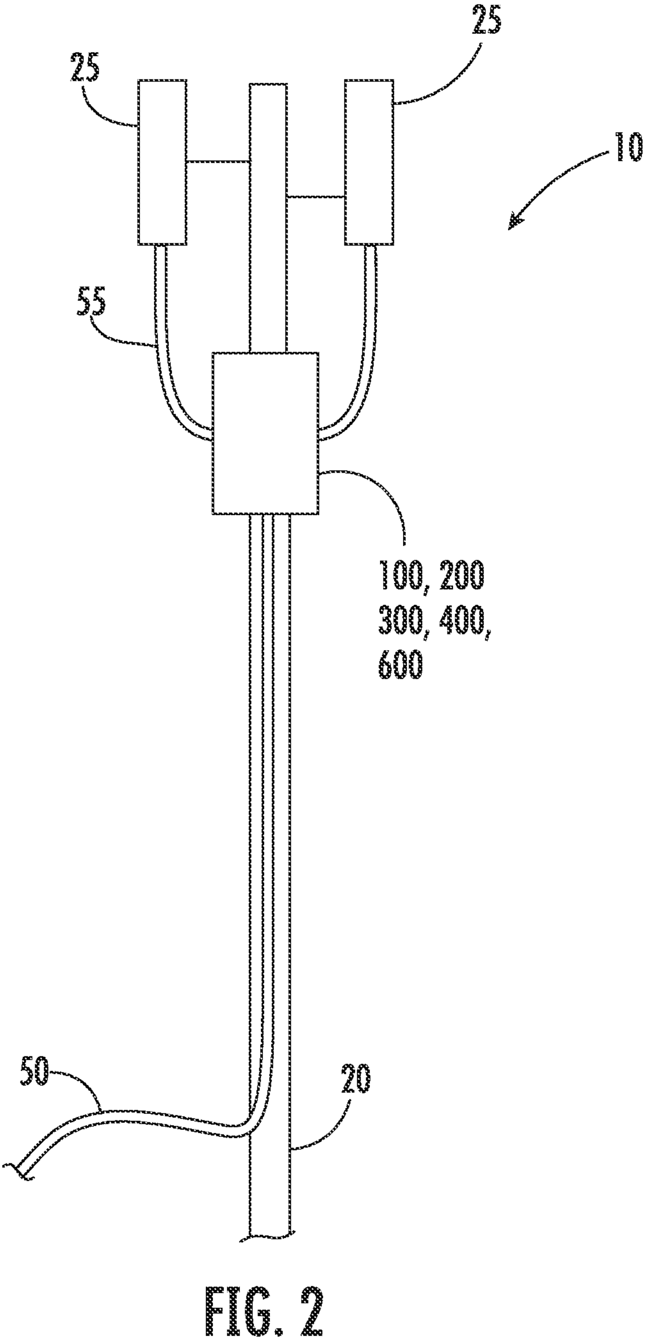
FIG. 2 is a schematic representation of an antenna tower site in a communications network in which connection interfaces according to embodiments of the present invention may be utilized.

The connection interfaces and interface assemblies according to embodiments of the present invention and described herein are suitable for use in managing cables on an antenna tower in a FTTA network. FIG. 2 illustrates an example antenna tower site 10 in a communications network, such as a FTTA network. The site 10 includes an antenna tower 20 at which one or more antennas and one or more remote radio heads (RRH) 25 can be mounted. Each RRH 25 is adapted to transmit and receive signals to and from devices (e.g., mobile phone, smartphones, devices with wireless internet connectivity, etc.) of subscribers to the communications network. In certain examples, the RRH 25 may be integrated into the antennas.

In certain examples, one or more of the connection interface assemblies (or connection interface) 100, 200, 300, 400, 600 shown and described herein are mounted to the antenna tower 20. One or more feeder cables 50 (e.g., fiber optic cables, electrical cables, hybrid cables) extend between the connection interface assemblies 100, 200, 300, 400, 600 and the network base station. One end of the one or more cables 50 engages inner/rear ports of the cable connection components 150, 250 of the connection interface assemblies 100, 200, 300, 400, 600. Additional cables 55 connect each RRH 25 to outer/front ports of the cable connection components 150, 250 of the connection interface(s) 100, 200, 300, 400, 600.

According to some embodiments, the additional cables 55 can be routed from the RRH 25 to the connection interface 100, 200, 300, 400, 600 during an initial installation of the RRH 25, even if a feeder cable 50 has not yet been routed to the antenna tower 20. Subsequently, one or more feeder cables 50 can be routed to the antenna tower 20 to the connection interface 100, 200, 300, 400, 600 to connect to the additional cables 55. Accordingly, such a design reduces the amount of cable routing performed on the antenna tower 20 during subsequent installation of a feeder cable 50. The connection interface 100, 200, 300, 400, 600 can also be used at other positions in a communications network.

Figure 3A:
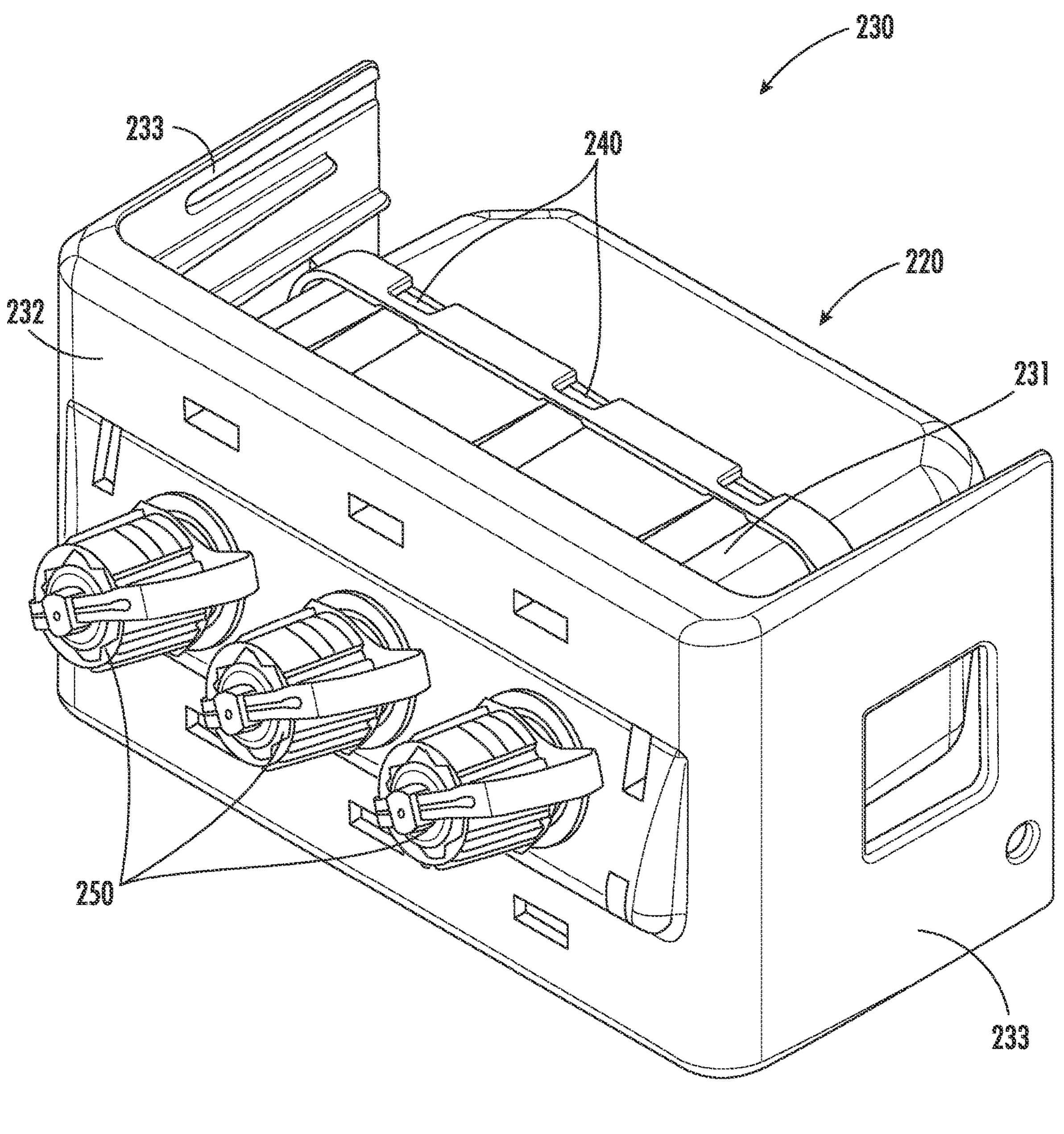
FIG. 3A is a top perspective view of a connection interface according to embodiments of the present invention.
Figure 3B:
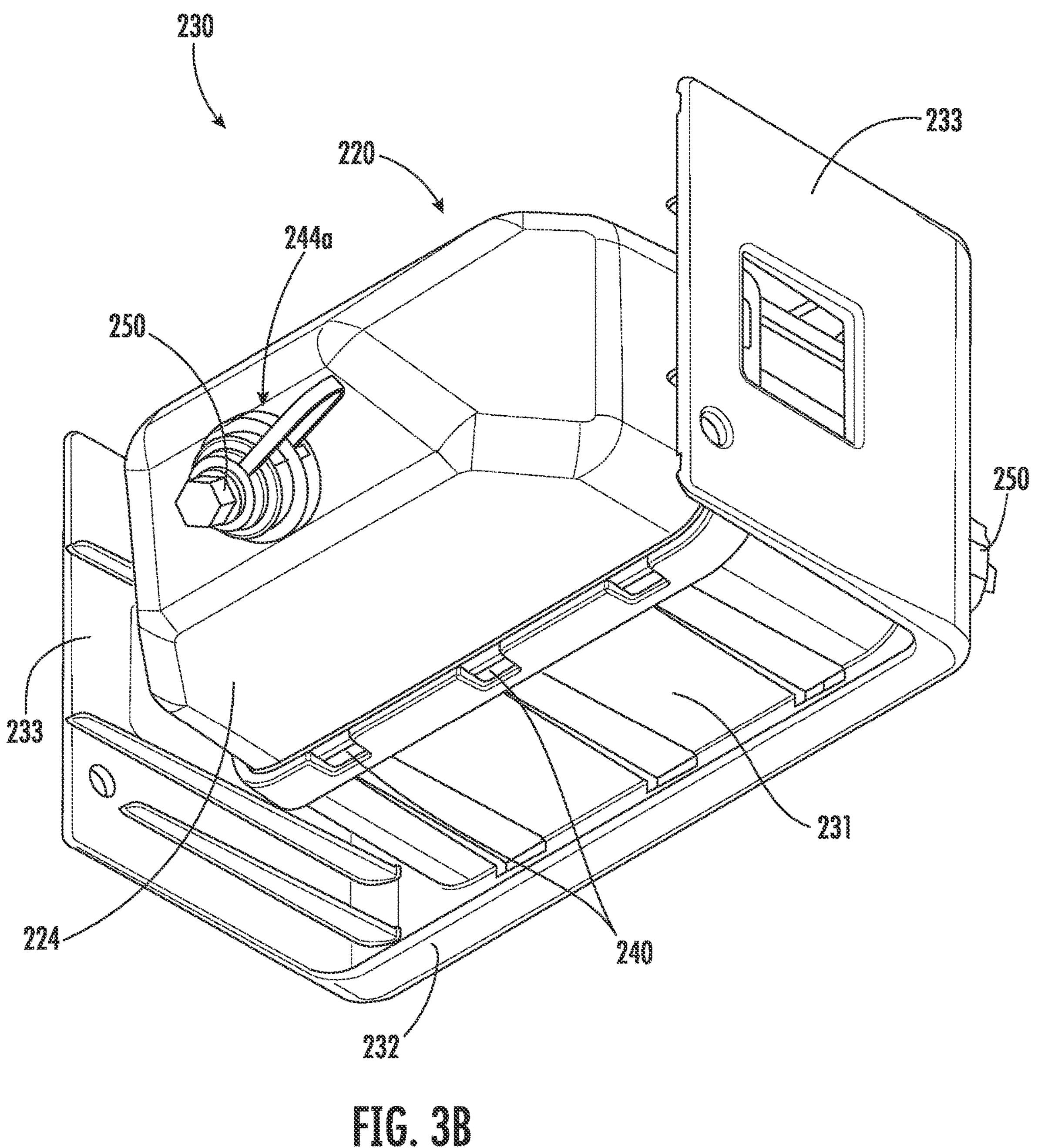
FIG. 3B is a bottom perspective view of the connection interface of FIG. 3A.
Figure 3C:
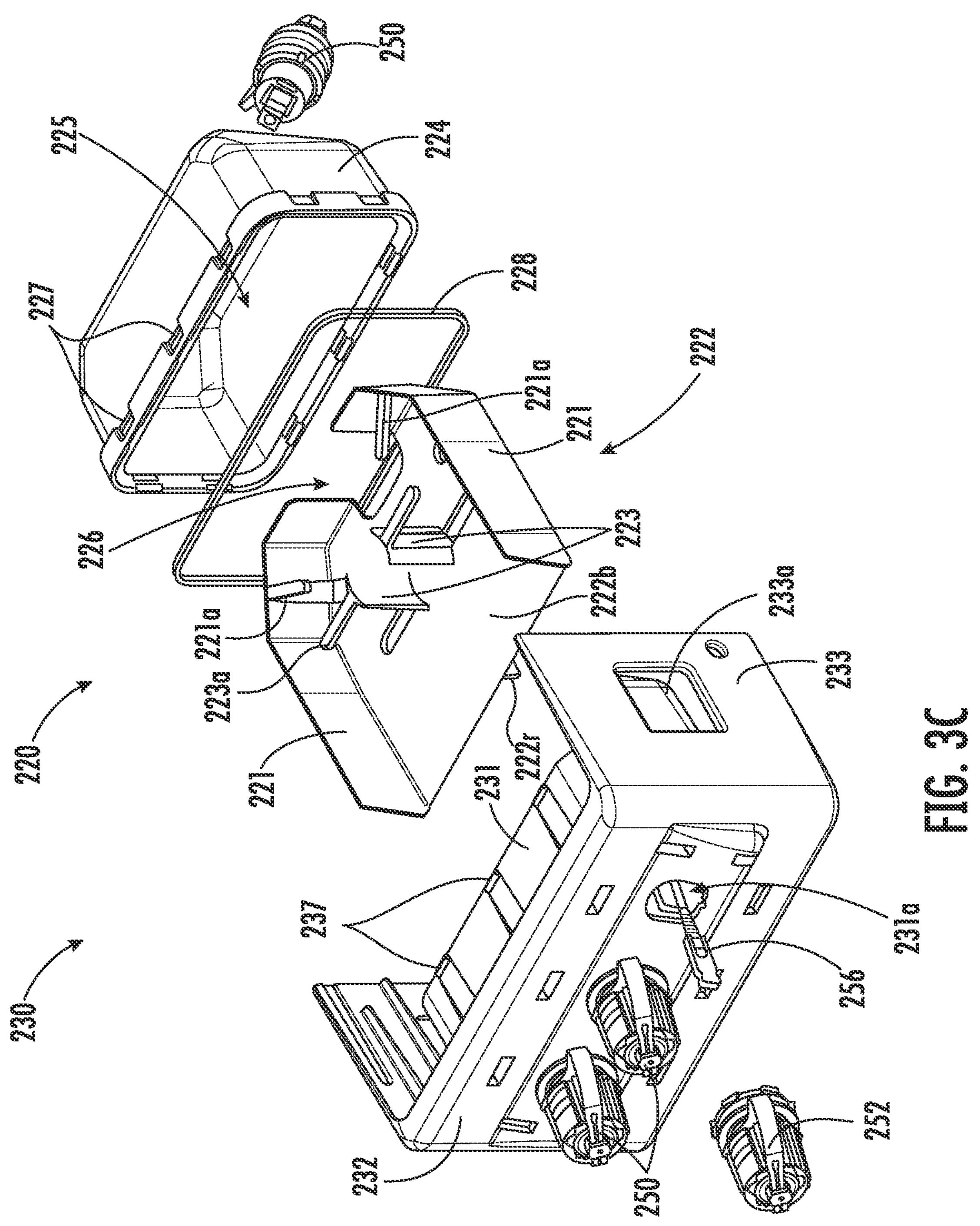
FIG. 3C is an exploded view of an enclosure of the connection interface of FIG. 3A.
Figure 4:
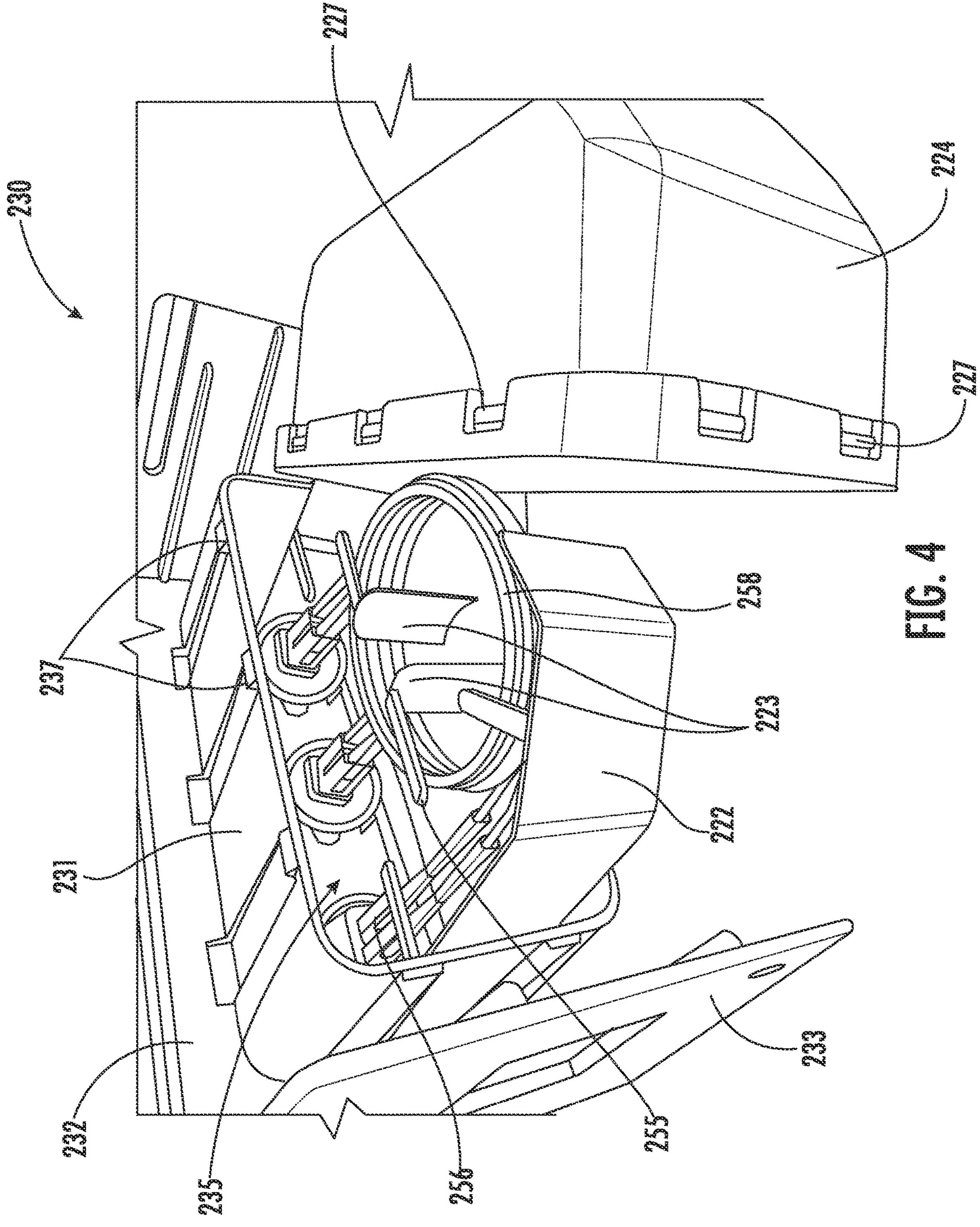
FIG. 4 is a photograph of an exemplary connection interface according to embodiments of the present invention with the enclosure opened.
Figure 5A:
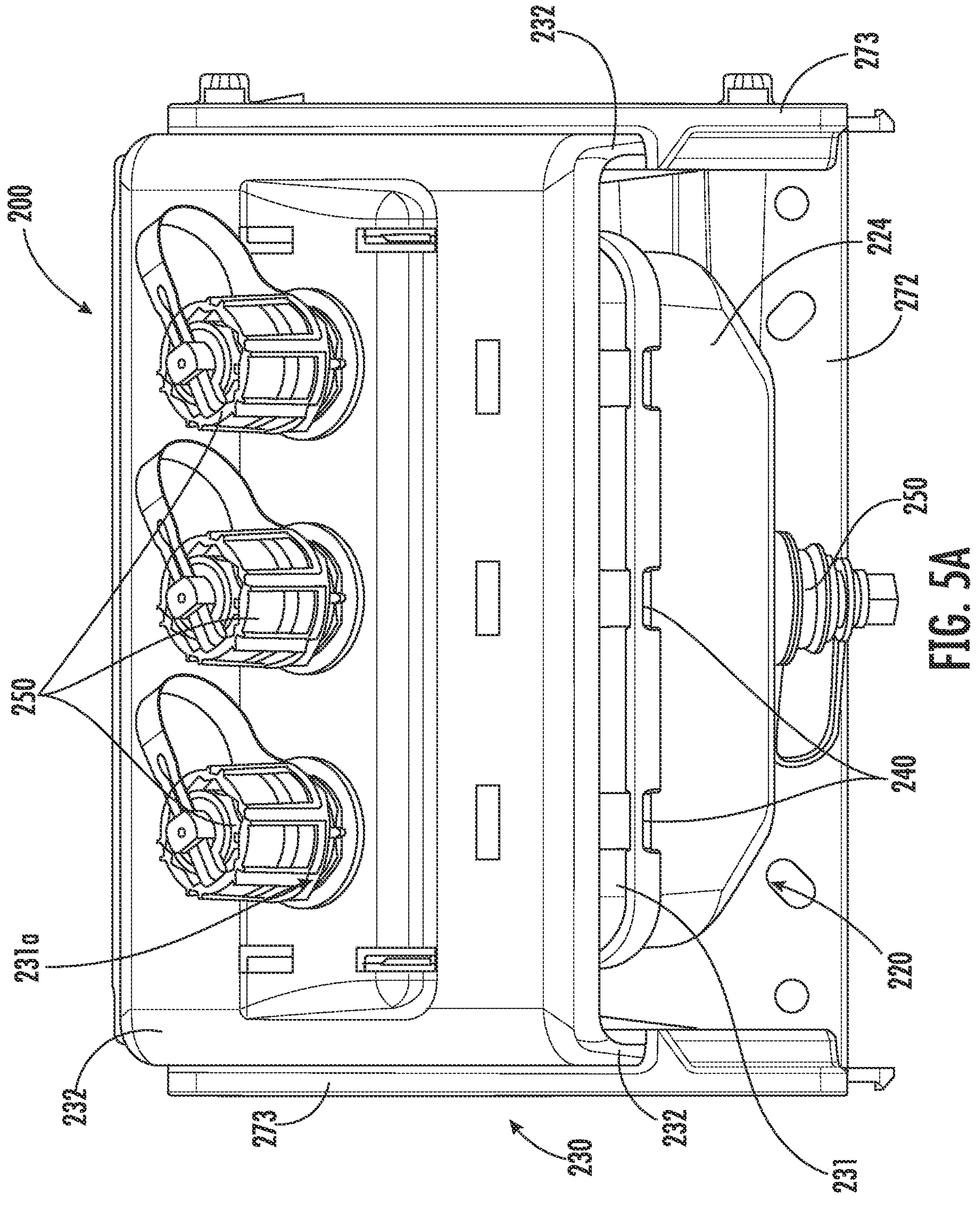
FIG. 5A is a bottom view of a connection interface assembly according to embodiments of the present invention.
Figure 5B:
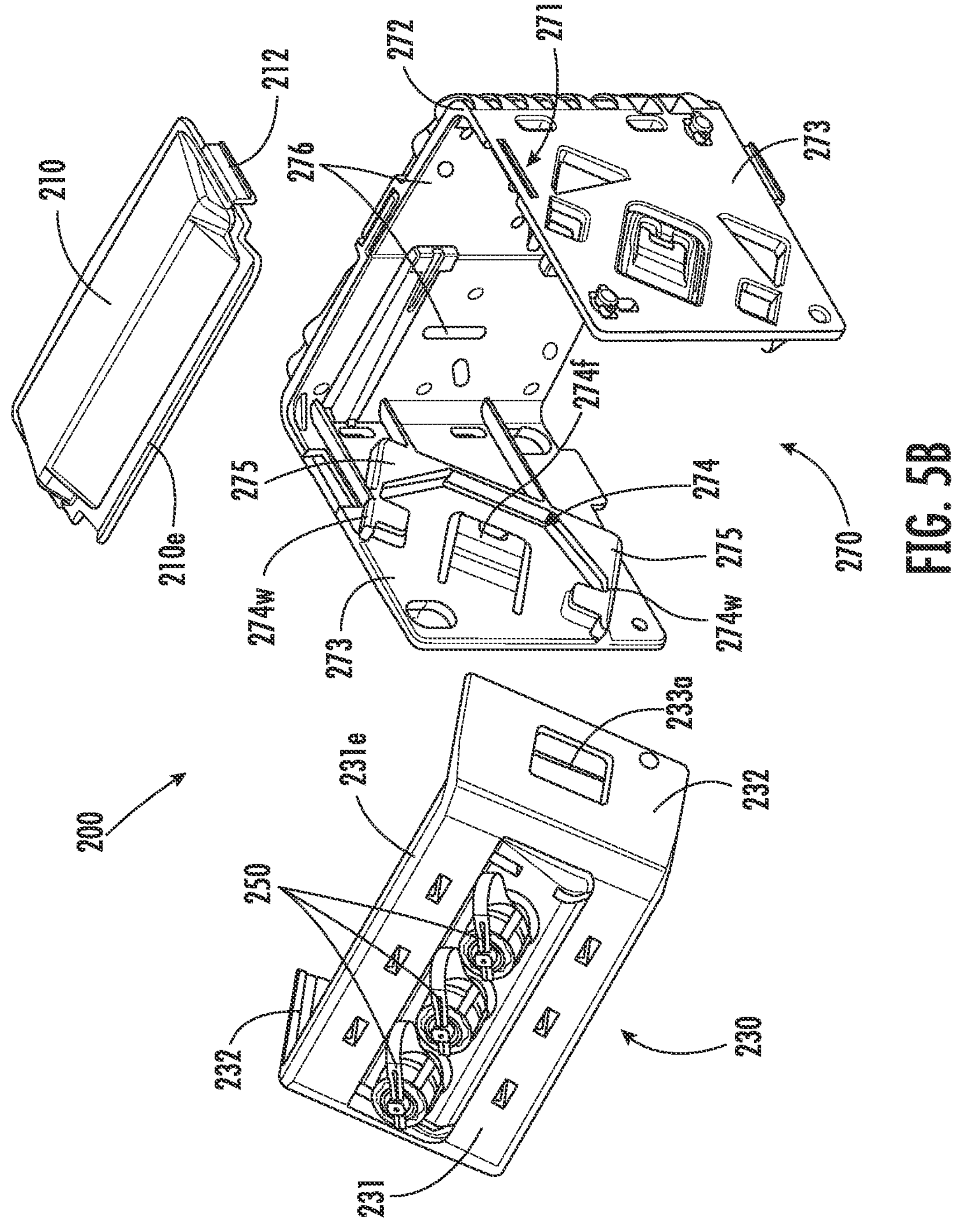
FIG. 5B is an exploded top perspective view of the connection interface assembly of FIG. 5A.
Figure 5C:
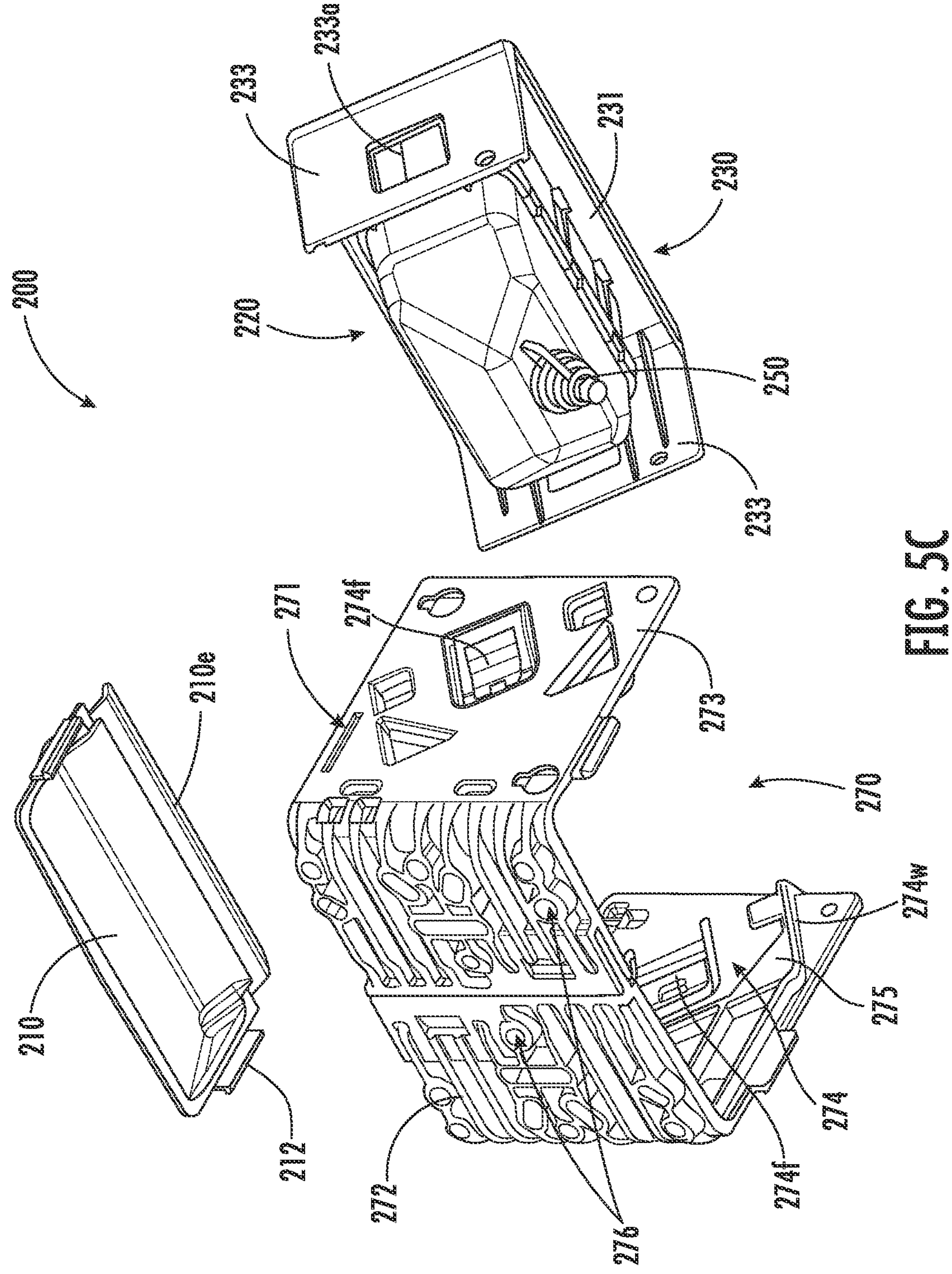
FIG. 5C is an exploded bottom perspective view of the connection interface assembly of FIG. 5A.
Figure 5D:
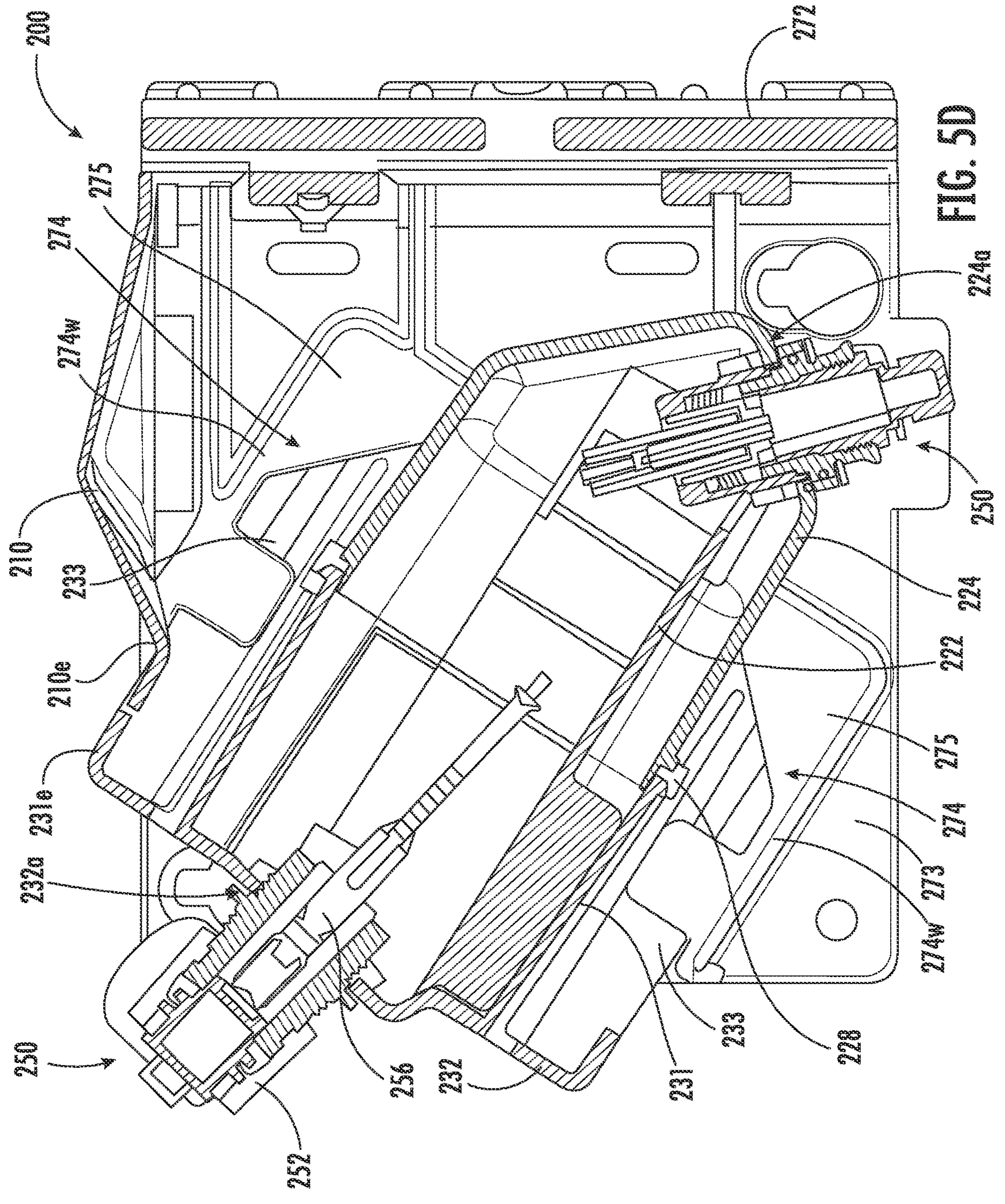
FIG. 5D is a cross-sectional side view of the connection interface assembly of FIG. 5A.

Referring now to FIGS. 3A-4, a cable connection module 230 according to embodiments of the present invention is illustrated. The cable connection module 230 is a component of a connection interface assembly 200 according to embodiments of the present invention and illustrated in FIGS. 5A-5D. The connection interface assembly 200 is similar to the assembly 100 and module 130 described herein. The assembly 200 differs from assembly 100 in that the assembly 200 includes an enclosure 220 integrated into the cable connection module 230. In some embodiments, the cable connection module 230 comprises a coarse wave division multiplexing (CWDM) module 255 (see, e.g., FIG. 7). In other embodiments, the cable connection module 230 comprises a dense wave division multiplexing (DWDM) module. The connection interface assembly 100 described above utilizes hardened (ruggedized) connectors 154 (e.g., IP-16 LC connectors) at both ends of the cable connection module 130 which are specifically designed for outdoor applications and harsh environments. In contrast, the CWDM or DWDM modules 255 utilized in the connection interface assembly 200 of the present invention are not designed for outdoor applications. The CWDM or DWDM module 255 allows one fiber optic cable 258 to be split into multiple fiber optic cables 258 (e.g., 2, 3, 4, . . . 12, 16, etc.), and thus, additional protection from certain environmental conditions (e.g., moisture, rain, snow, etc.) is needed. As discussed in further detail below, the connection interface assembly 200 of the present invention (i.e., the cable connection 230 and enclosure 220) provides a watertight seal to help protect the fiber optic cables 258 and CWDM or DWDM module 255 contained within the enclosure 220 from harsh environmental conditions (see, e.g., FIG. 4).

As shown in FIGS. 3A-3C and FIG. 4, the cable connection module 230 includes a main body (or bulkhead) 231 coupled to or integral with a front wall 232. The main body 231 defines an interior cavity 235. The cable connection module 230 also includes opposite first and second side walls 233 that project rearwardly from the front wall 232. In some embodiments, the front wall 232 and the first and second side walls 233 of the cable connection module 230 cooperate to define a C-shaped configuration when viewed from an end of the cable connection module 230. A rear of the cable connection module 230 is open. The main body 231 (and front wall 232) includes one or more openings or apertures **231*a* for receiving one or more of the cable connection components 250 (see, e.g., FIG. 3C). In other embodiments, the cable connection components 250 can be otherwise secured to the cable connection module 230. The cable connection components 250 may include, for example, fiber optic adapters 252 configured to connect to a fiber optic connector 256. In other examples, the cable connection components 250 include plug connectors (e.g., optical plug connectors, electrical plug connectors, hybrid plug connectors, etc.), optical cable fanouts, slice holders for optical and/or electrical splices, or other such cable interfaces. In some embodiments, the cable connection module 230 may be formed from a polymeric material, for example, polycarbonate. As mentioned above and discussed in further detail below, the cable connection module 230 further includes an enclosure 220. The enclosure 220 is configured to engage the main body 231**.

FIG. 3C illustrates an exploded view of the cable connection module 230 and the enclosure 220. As shown in FIG. 3C, the enclosure 220 includes a fiber tray 222 and a cover 224. The fiber tray 222 includes a bottom **222*b* and one or more side walls 221. A front of the fiber tray 222 is open and at least a portion of a rear of the fiber tray 222 has an opening 226 sufficient to allow one or more fiber optic cables 258 from a cable connection component 250 to be routed into the tray 222. As shown in FIG. 4, the fiber tray 222 is sized and configured to hold the CWDM or DWDM module 255 and fiber optic cables 258** being routed and split therefrom.

At least a portion of the fiber tray 222 is configured to be slidably received and secured within the interior cavity 235 of the main body 231. For example, as shown in FIG. 4, in some embodiments, about half of the fiber tray 222 is received within the interior cavity 235 of the main body 231. In some embodiments, to assist in sliding the fiber tray 222 into the main body 231, the fiber tray 222 may comprise a rail 222*r* extending outwardly from the bottom 222*b* (see, e.g., FIG. 3C) which is configured to be received by a corresponding slot (not shown) along an inner surface of the main body 231.

In some embodiments, the fiber tray 222 may further include one or more cable organizing members 223. As shown in FIG. 3C, the cable organizing members 223 may extend inwardly and generally perpendicularly from the bottom portion 222*b* of the tray 222. As shown in FIG. 4, the cable organizing members 223 are positioned such that any excess length of the fiber optic cables 258 may be wrapped around the cable organizing members 223. In some embodiments, as shown in FIG. 3C and FIG. 4, each cable organizing member 223 may include an arm member 223*a* extending outwardly therefrom. The respective arm members 223*a* may help to contain or hold any excess length of the fiber optic cables 258 wrapped around the cable organizing members 223 and within the tray 222. In some embodiments, additional arm members 221*a* may extend inwardly from the one or more side walls 221. Similar to the arm members 223*a* extending from the cable organizing members 223, the additional arm members 221*a* extending from the side walls 221 may further help to contain or hold any excess length of the fiber optic cables 258 within the boundaries of the tray 222.

The cover 224 of the enclosure 220 has an outer wall that defines an interior cavity 225. The outer wall of the cover 224 has an opening or aperture 224*a* for receiving a cable connection components 250 (see, e.g., FIG. 3B). The cover 224 is configured to engage the main body 231 to surround the fiber tray 222 such that the fiber tray 222 is contained within the interior cavities 225, 235 of the cover 224 and the main body 231.

The enclosure 220 further includes an annular sealing gasket 228 that resides between the cover 224 and the main body 231 when secured together. The sealing gasket 228 helps form a watertight seal between the cover 224 and main body 231 to further protect the fiber optic cables 258 and CWDM or DWDM module 255 within the enclosure 220 from environmental conditions.

The cover 224 is secured to the main body 231 via one or more securing features 240. In some embodiments, the securing features 240 may comprise a snap-fit mechanism. For example, as shown in FIG. 3C and FIG. 4, in some embodiments, the cover 224 may include one or more recesses or apertures 227 and the main body 231 may include one or more corresponding latches or protrusions 237 that are configured to engage the one or more recesses or apertures 227 to secure the cover 224 to the main body 231. In other embodiments, the one or more recesses or apertures 227 may reside on the main body 231 and the corresponding latches or protrusions 237 may reside on the cover 224. In some embodiments, the components of the enclosure 220 (i.e., the fiber tray 222 and/or cover 224) may be formed from a polymeric material, for example, polycarbonate.

Referring now to FIGS. 5A-5D, in some embodiments, the cable connection module 230 is adapted to be inserted into a base module 270 which together define the connection interface assembly 200 according to embodiments of the present invention. Similar to the cable connection module 230, the base module 270 may be formed from a polymeric material, for example, polycarbonate. The base module 270 includes a back wall 272 and opposite first and second side walls 273 that project forwardly from the back wall 272. Similar to the cable connection module 230, the back wall 272 and the first and second side walls 273 of the base module 270 cooperate to define a C-shaped configuration when viewed from an end of the base module 270. The back wall 272 may comprise a plurality of mounting apertures 276 which may be used to secure the connection interface assembly 200 to a mounting structure 120 (e.g., a mounting pole) (see, e.g., FIG. 1 and FIGS. 9A-10B).

The cable connection module 230 is sized and configured to be inserted through the open front of the base module 270. In some embodiments, the base module 270 defines a pair of module mounting locations 274 between the first and second side walls 273 for receiving the cable connection module 230. In some embodiments, each of the module mounting locations 274 of the base module 270 may include a flexible finger 274*f* with an end or stop member. The flexible finger 274*f* is configured to snap into an aperture 233*a* defined in each side wall 233 of the cable connection module 230 as the cable connection module 230 is inserted into the base module 270. The snap-fit type securing mechanism (i.e., flexible finger 274*f* and corresponding aperture 233*a*) secures the cable connection module 230 to the base module 270. In other examples, the side walls 273 may define apertures and the cable connection module 230 may include the deflectable stop members. In other examples, the cable connection module 230 may otherwise secure the base module 270.

In addition, in some embodiments, the side walls 273 of the base module 270 include first and second receptacles 275 at the module mounting locations 274 for respectively receiving the side walls 233 of the cable connection module 230. In some embodiments, the first and second receptacles 275 are bounded by guide walls 274*w* that protrude inwardly from the side walls 273 of the base module 270. The guide walls 274*w* help to guide the side walls 233 of the cable connection module 230 as the cable connection module 230 is being inserted into the base module 270.

Figure 6A:
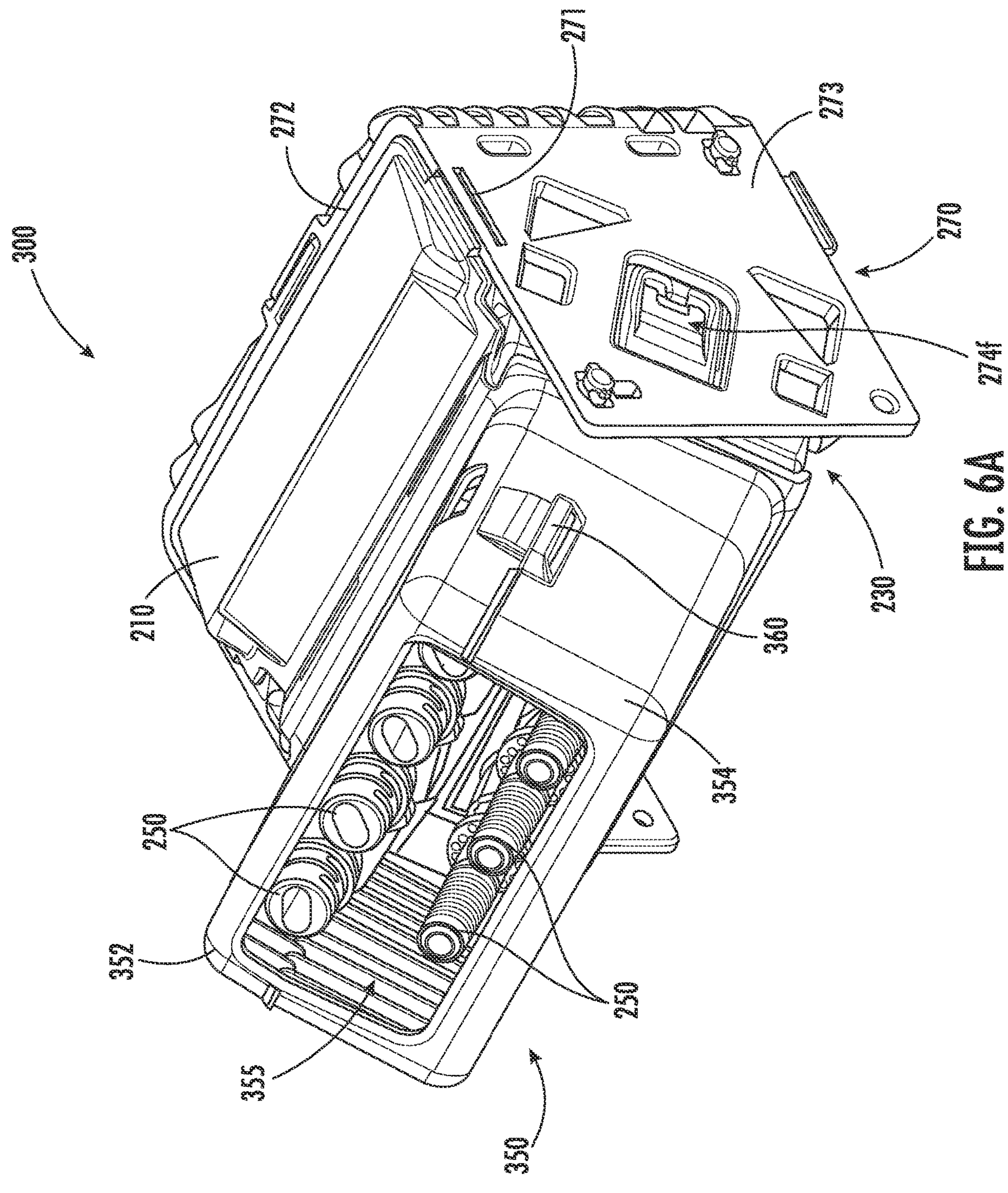
FIG. 6A is a top perspective view of a connection interface assembly including an extension cover according to embodiments of the present invention.
Figure 6B:
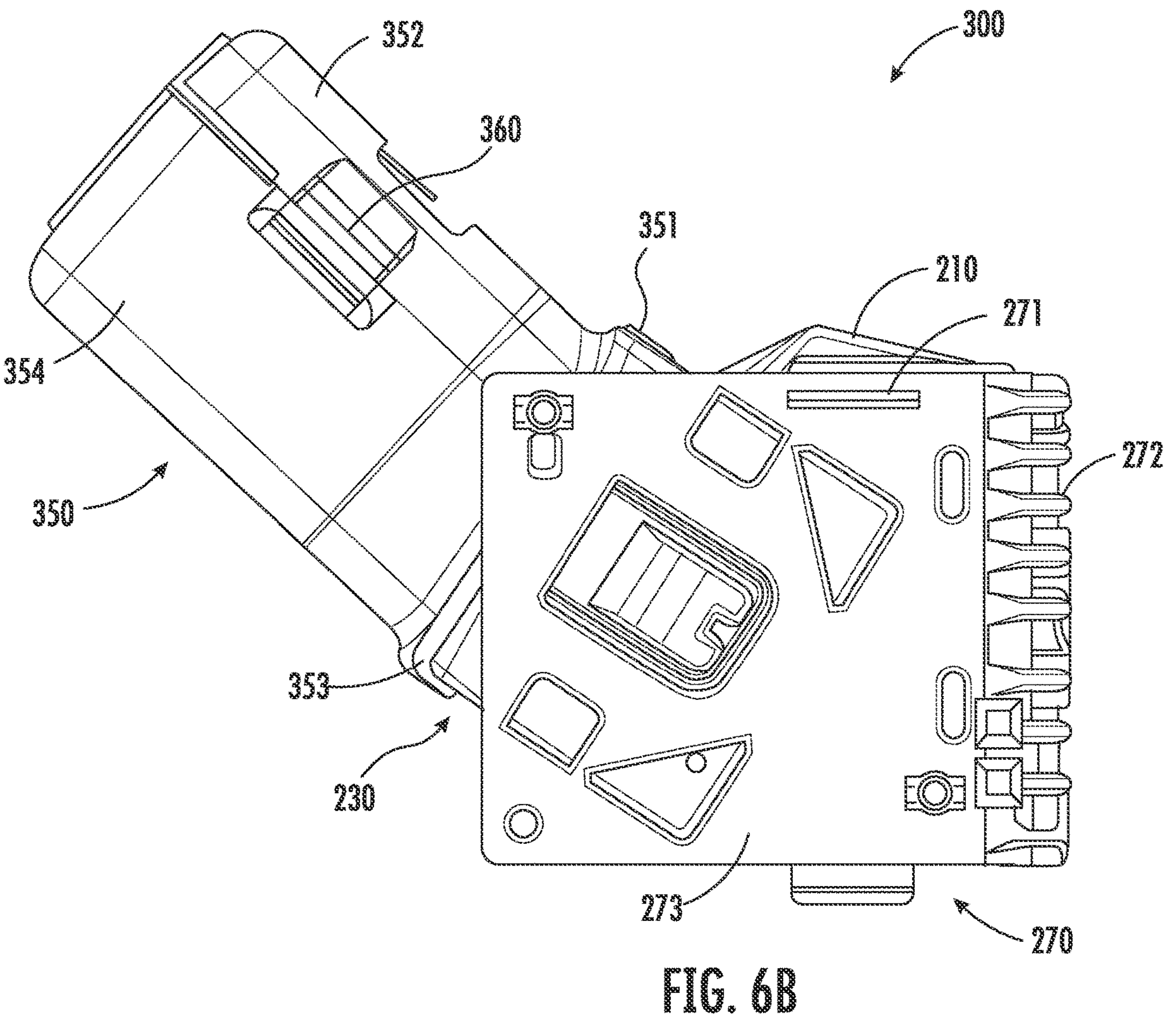
FIG. 6B is a side view of the connection interface assembly of FIG. 6A.

Still referring to FIGS. 5A-5D, in some embodiments, the connection interface assembly 200 of the present invention may further include a top cover 210. The top cover 210 is configured to engage the connection module 230 and/or the base module 270 to further protect the enclosure 220 residing therebetween. For example, in some embodiments, a front edge of the top cover 210 may be angled upwardly to define a lip or flanged edge 210*e*. The flanged front edge 210*e* is configured to engage a corresponding edge or lip 231*e* residing along a top inner surface of the cable connection module 230. In addition, in some embodiments, the top cover 210 further comprises a pair of deflectable arms 212, each arm 212 extending outwardly from opposite sides of the top cover 210. Each arm 212 is configured to snap into a corresponding aperture or slot 271 defined in each side wall 273 of the base module 270. After the cable connection module 230 has been inserted into and secured to the base module 270, the flanged front edge 210*e* of the top cover 210 may be engaged with the edge or lip 231*e* of the cable connection module 230. The top cover 210 may then pressed downwardly to snap each deflectable arm 212 into engagement with the respective slot 271 in the side wall 273 of the base module 270 (see also, e.g., FIGS. 6A-6B).

Referring now to FIGS. 6A-6F, a connection interface assembly 300 according to embodiments of the present invention is illustrated. Properties and/or features of the connection interface assembly 300 may be as described above in reference to the connection interface assembly 200 shown in FIGS. 5A-5D and duplicate discussion thereof may be omitted herein for the purposes of discussing FIGS. 6A-6F. In some embodiments, the connection interface assembly 300 differs from the connection interface assembly 200 described herein in that the connection interface assembly 300 includes an extension cover 350. As described in further detail below, the extension cover 350 is configured to protect the cable connection components 250 extending outwardly from the front wall 232 of the cable connection module 230 of connection interface assembly 300.

As shown in FIGS. 6A-6F, the extension cover 350 includes a top member 352 and a bottom member 354. The top and bottom members 352, 354 cooperate together to form an inner cavity 355. The inner cavity 355 is sized and configured to contain the cable connection components 250 that extend outwardly from the cable connection module 230 therein (i.e., when the top and bottom members 352, 354 are joined together).

In some embodiments, the top and bottom members 352, 354 of the extension cover 350 may be releasably secured together via one or more securing features 360. Similar to other securing features described herein, the one or more securing features 360 of the extension cover 350 may comprise a snap-fit mechanism, such as cantilevered latches. For example, as shown in FIGS. 6D-6E, the top member 352 may include one or more cantilever beams with tapered hooks 362. The cantilever beams/hooks 362 are each configured to deflect and snap into a corresponding recess 364 defined in opposing side walls of the bottom member 354 as the top member 352 and bottom member 354 are joined together. The snap-fit securing mechanism locks the top and bottom members 352, 354 together with the cable connection components 250 residing therebetween (i.e., within the formed inner cavity 355). In other examples, the side walls of the top member 352 may define recesses and the bottom member 354 may include the deflectable cantilever beams/hooks. In other examples, the top member 352 may otherwise be secured to the bottom member 354.

In some embodiments, the extension cover 350 may be configured to be secured to the cable connection module 230 of the connection interface assembly 300. As shown in FIG. 6B, FIG. 6D, FIG. 6E, and FIG. 6F, in some embodiments, the top and bottom members 352, 354 of the extension cover 350 may include respective hooking members 351, 353 extending outwardly therefrom. The hooking members 351, 353 are configured to engage corresponding recesses 301, 303 in the cable connection module 230. The hooking members 351, 353 (when engaged with a corresponding recess 301, 303) help prevent the extension cover 350 from being pulled away from the cable connection module 230 (and connection interface assembly 300). In some embodiments, the hooking members 351, 353 may extend along the width of the top and bottom members 352, 354 and the corresponding recesses 301, 303 may extend along the width of the cable connection module 230. In some embodiments, the hooking members 351, 353 and corresponding recesses 301, 303 may form a snap-fit mechanism. For example, the hooking members 351, 353 may be configured to deflect and snap into the recesses 301, 303 defined in the cable connection module 230.

Figure 6C:
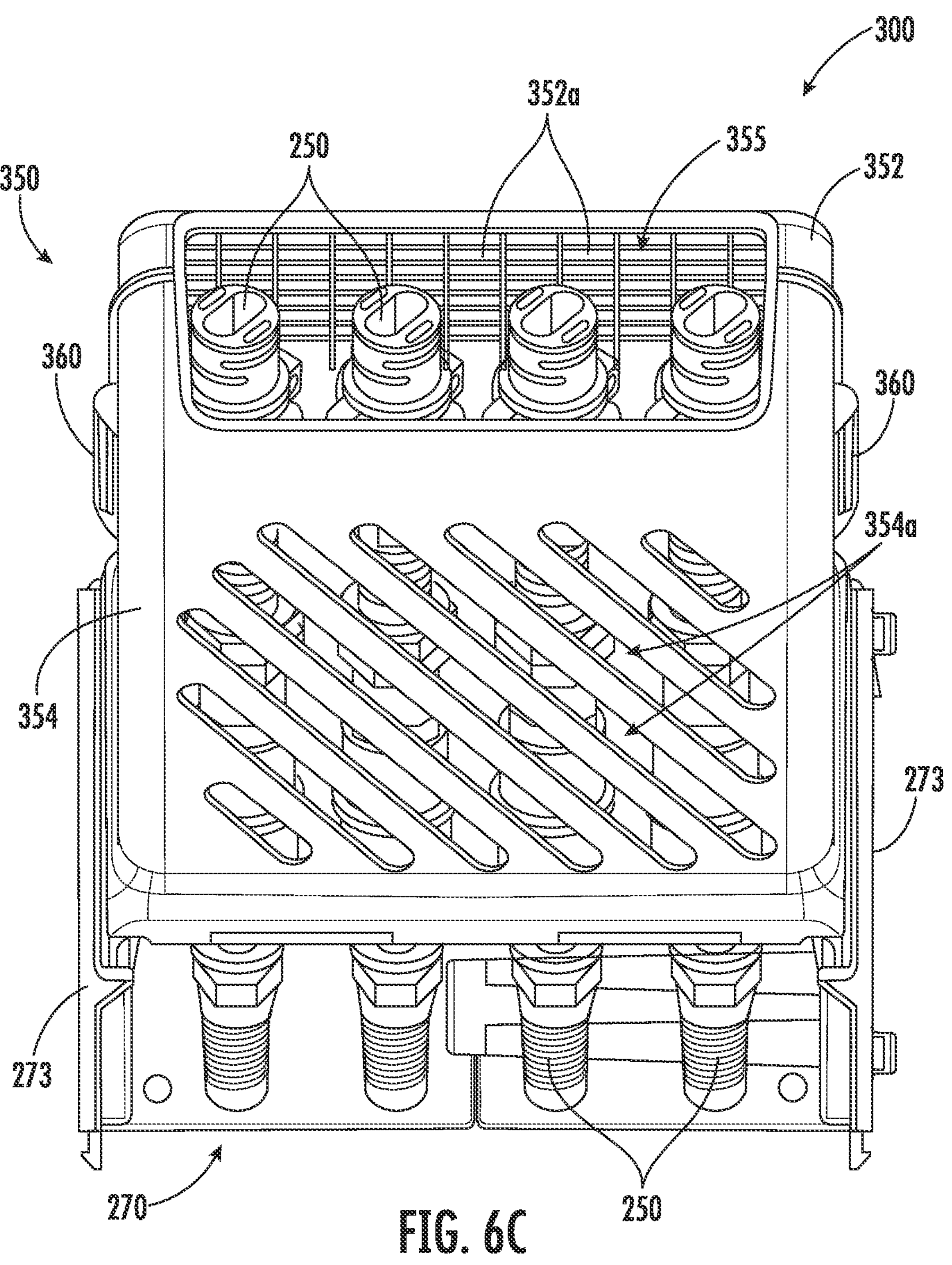
FIG. 6C is a bottom perspective view of the connection interface assembly of FIG. 6A.
Figure 6D:
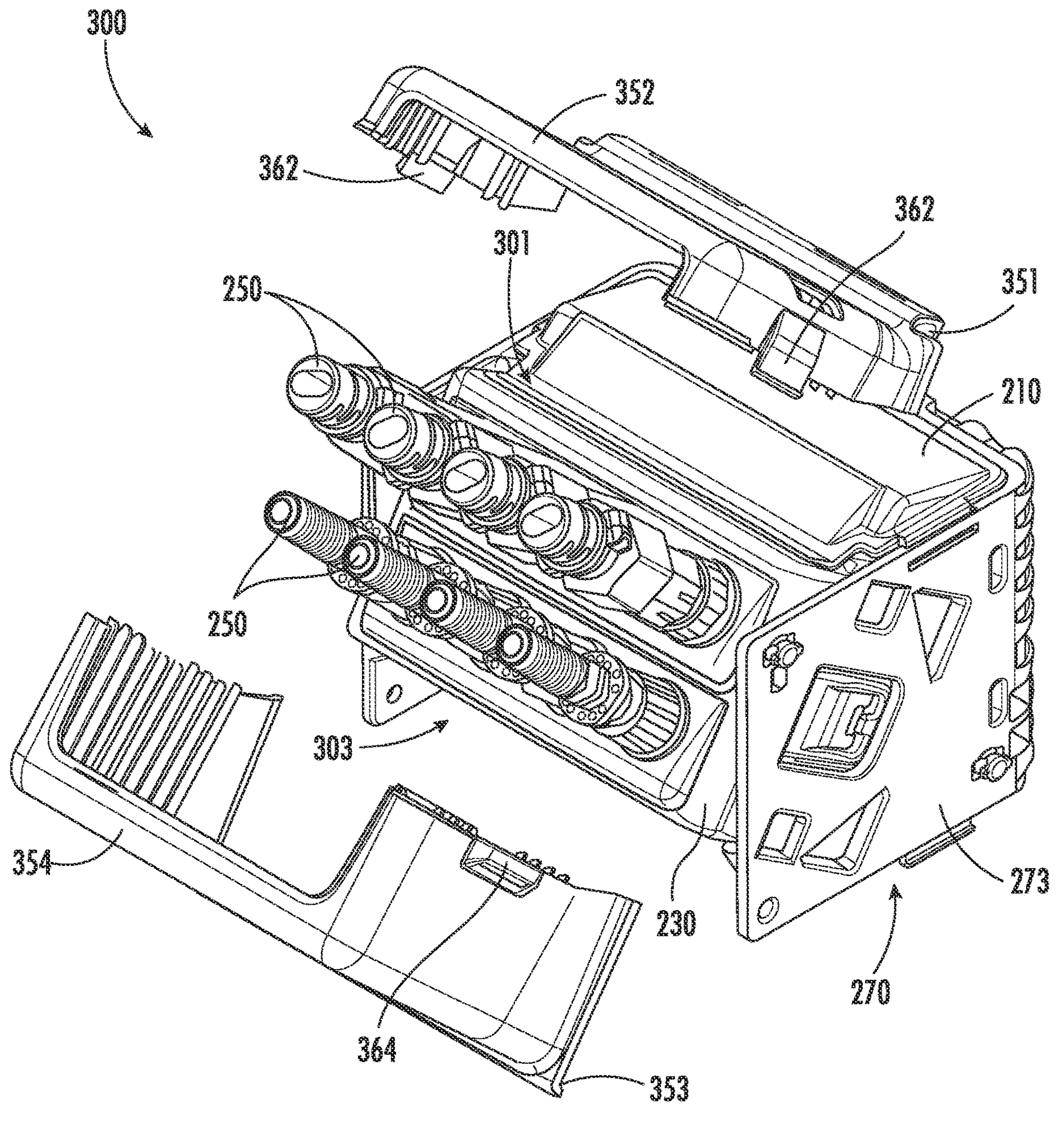
FIG. 6D is an exploded top perspective view of the connection interface assembly of FIG. 6A.
Figure 6E:
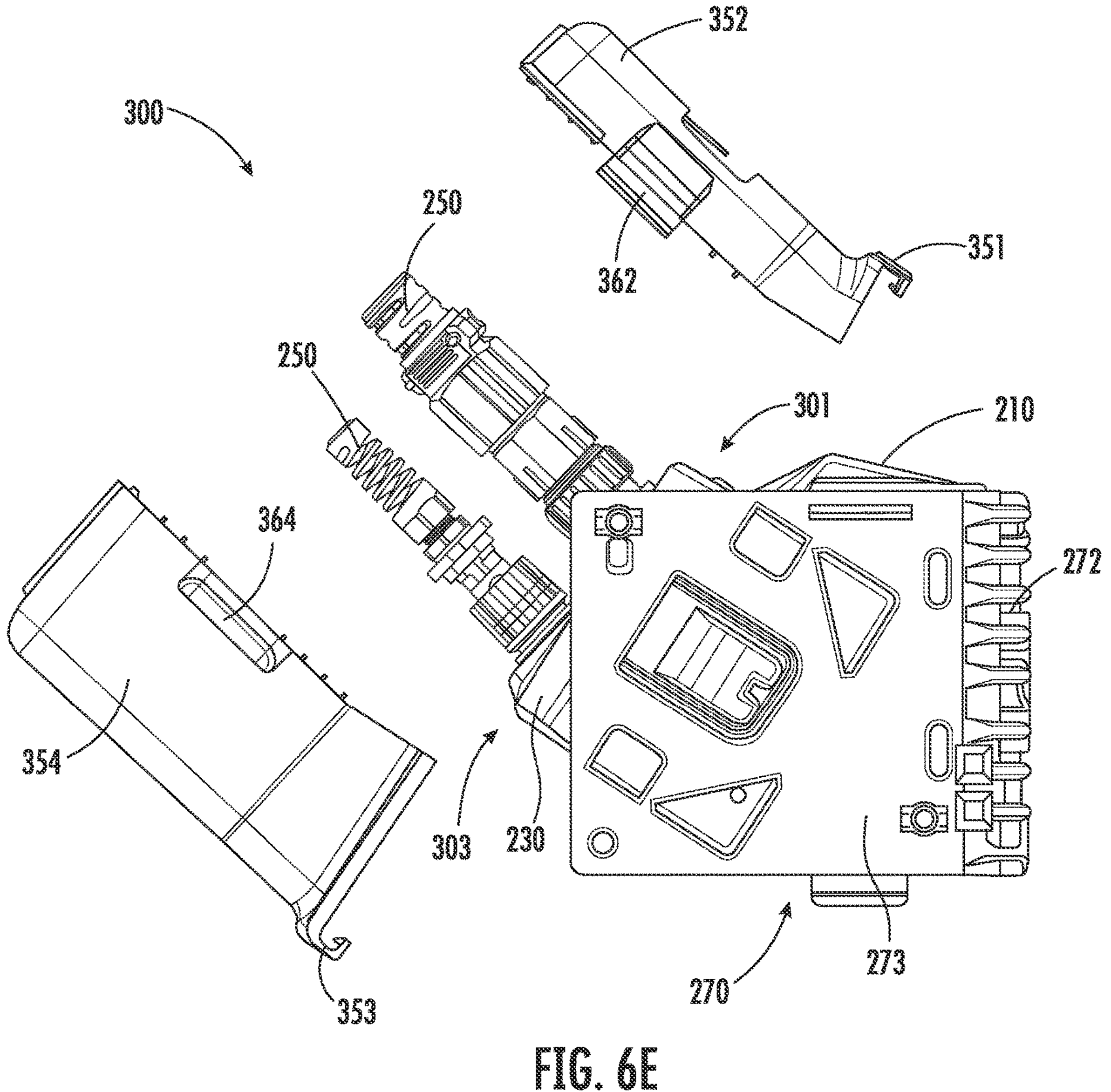
FIG. 6E is an exploded side view of the connection interface assembly of FIG. 6A.
Figure 6F:
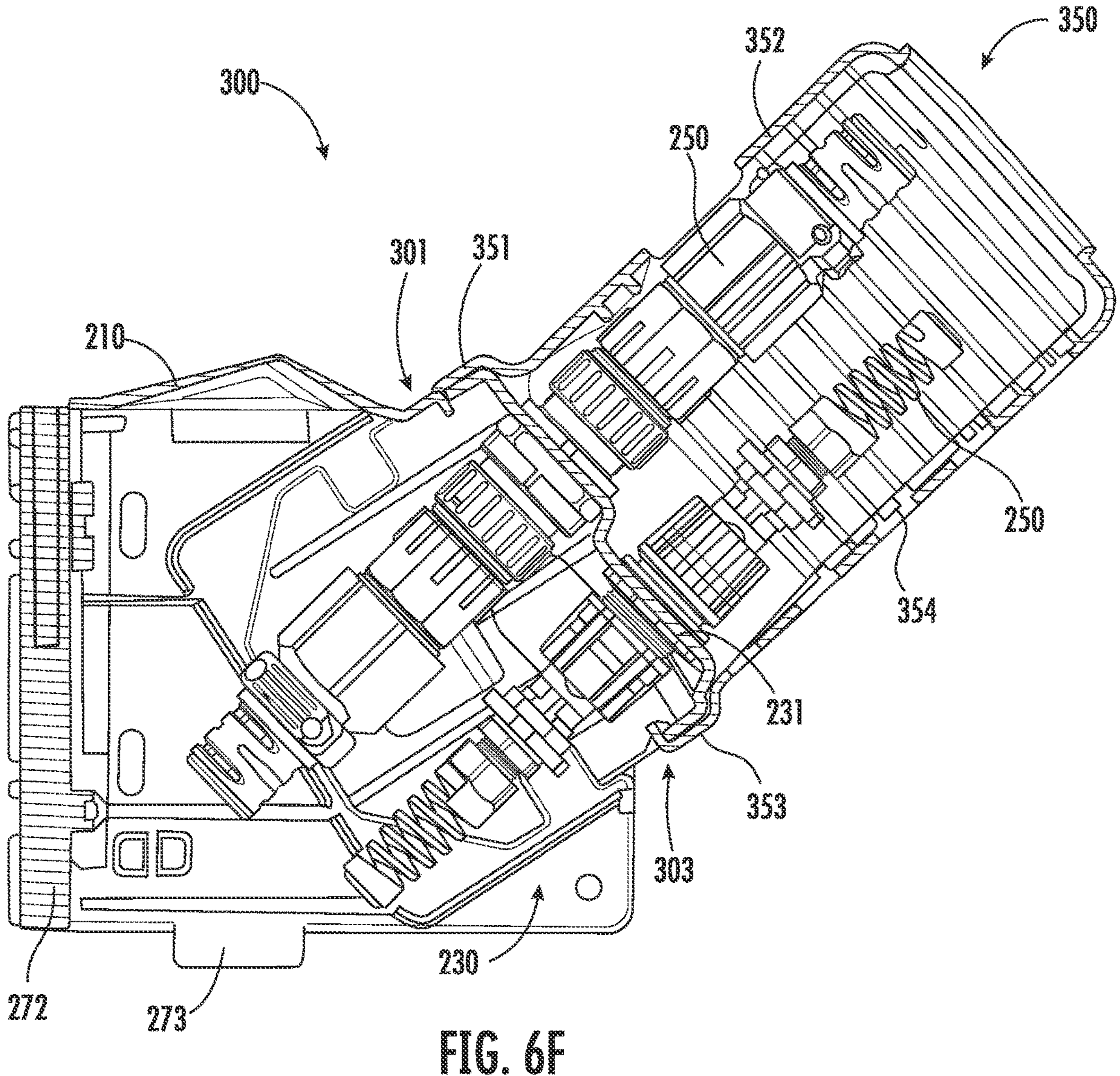
FIG. 6F is a cross-sectional side view of the connection interface assembly of FIG. 6A.

As shown in FIG. 6C, in some embodiments, the top and bottom members 352, 354 may comprises a plurality of apertures **352*a* and/or slots 354*a*. The apertures and slots 352*a*, 354*a* help prevent dirt, debris, bugs, etc. from getting trapped within the extension cover 350. The apertures and slots 352*a*, 354*a* also help to reduce the overall weight of the extension cover 350. While FIG. 6C illustrates apertures 352*a* in the top member 352 and slots 354*a* in the bottom member 354, any configuration of apertures 352*a* and/or slots 354*a* may be used in the top and bottom members 352, 354 of the extension cover 350**.

Figure 7A:
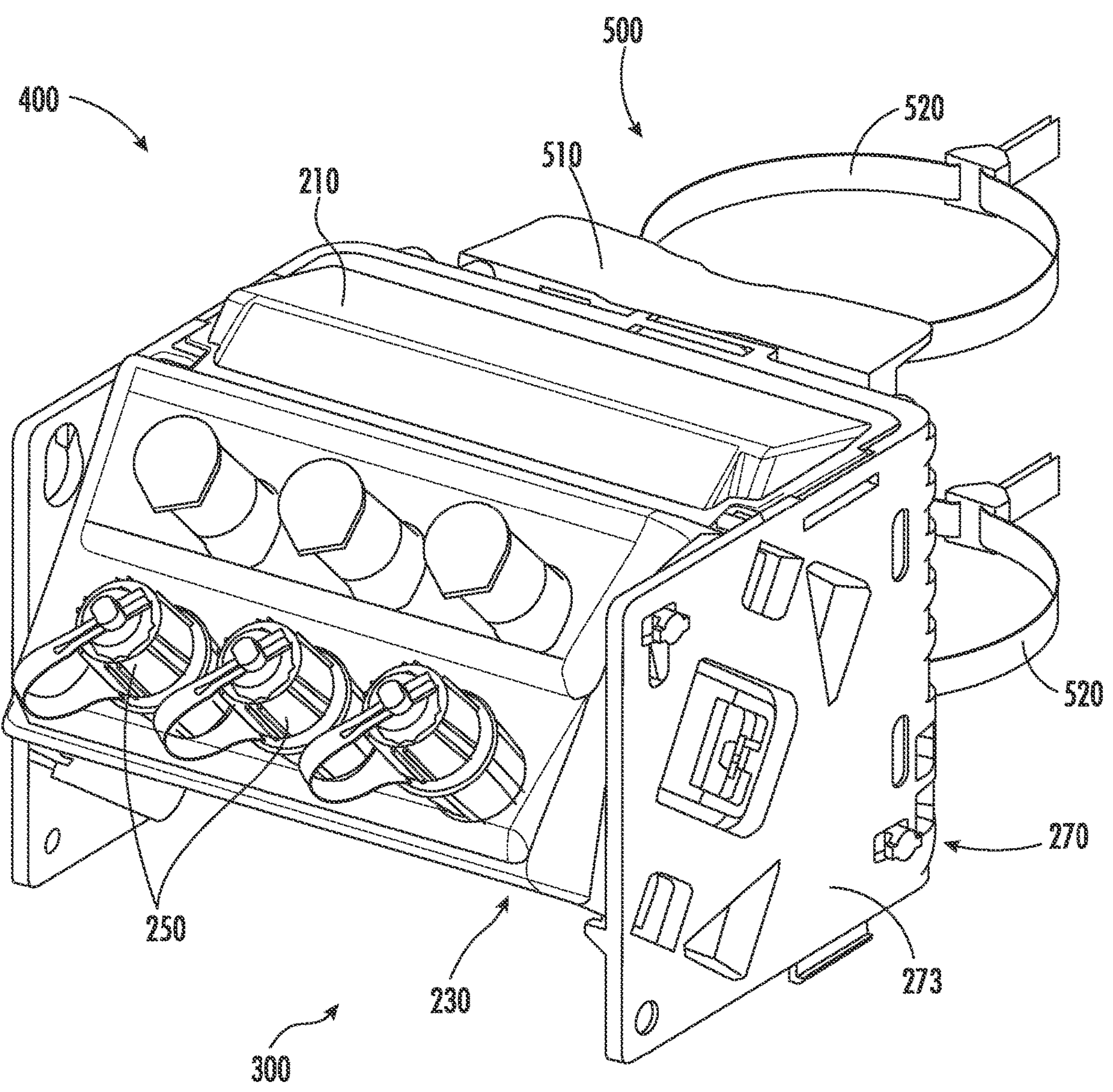
FIG. 7A is a front perspective view of a connection interface assembly including a mounting bracket according to embodiments of the present invention.
Figure 7B:
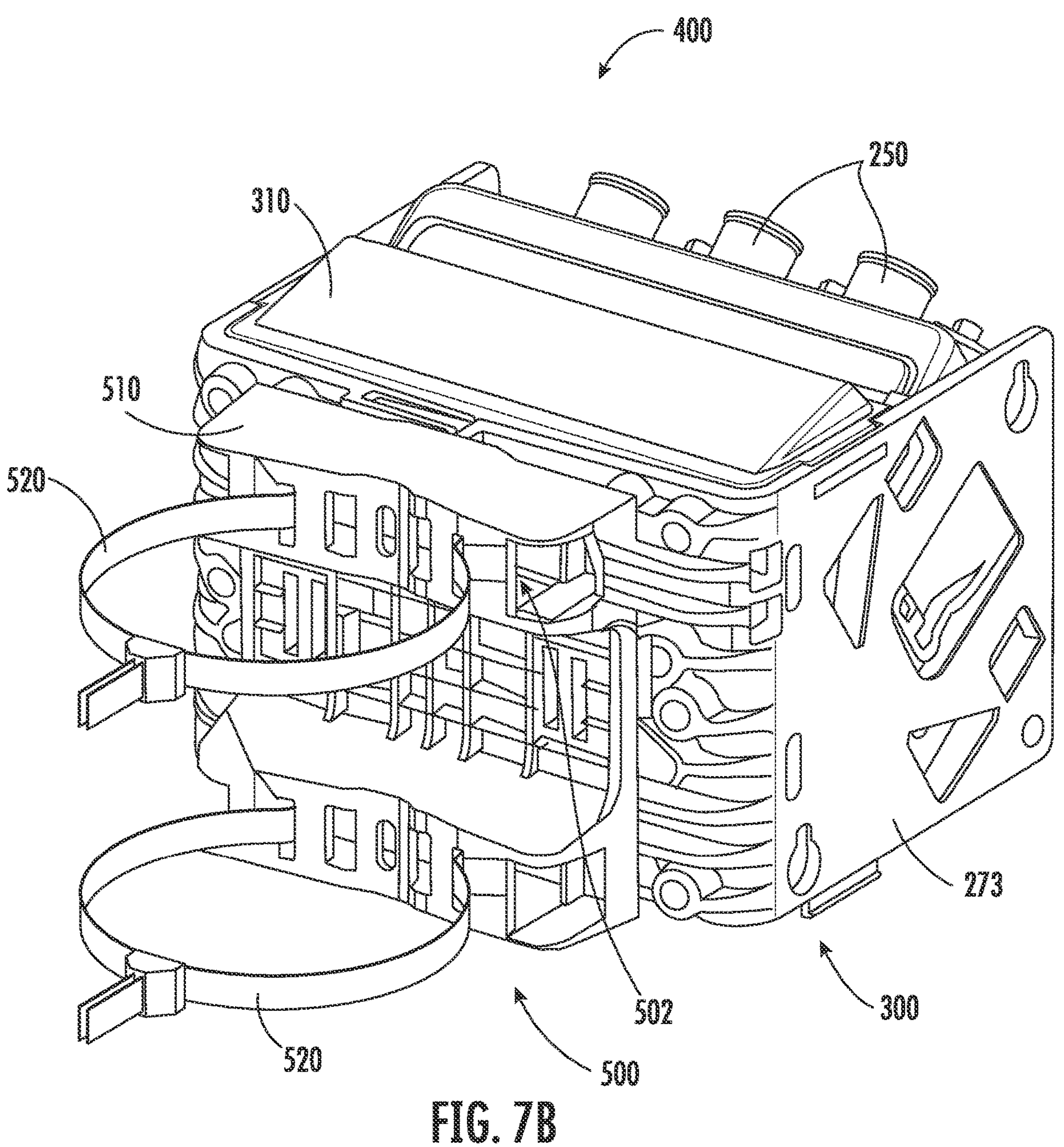
FIG. 7B is a rear perspective view of the connection interface assembly of FIG. 7A.
Figure 7C:
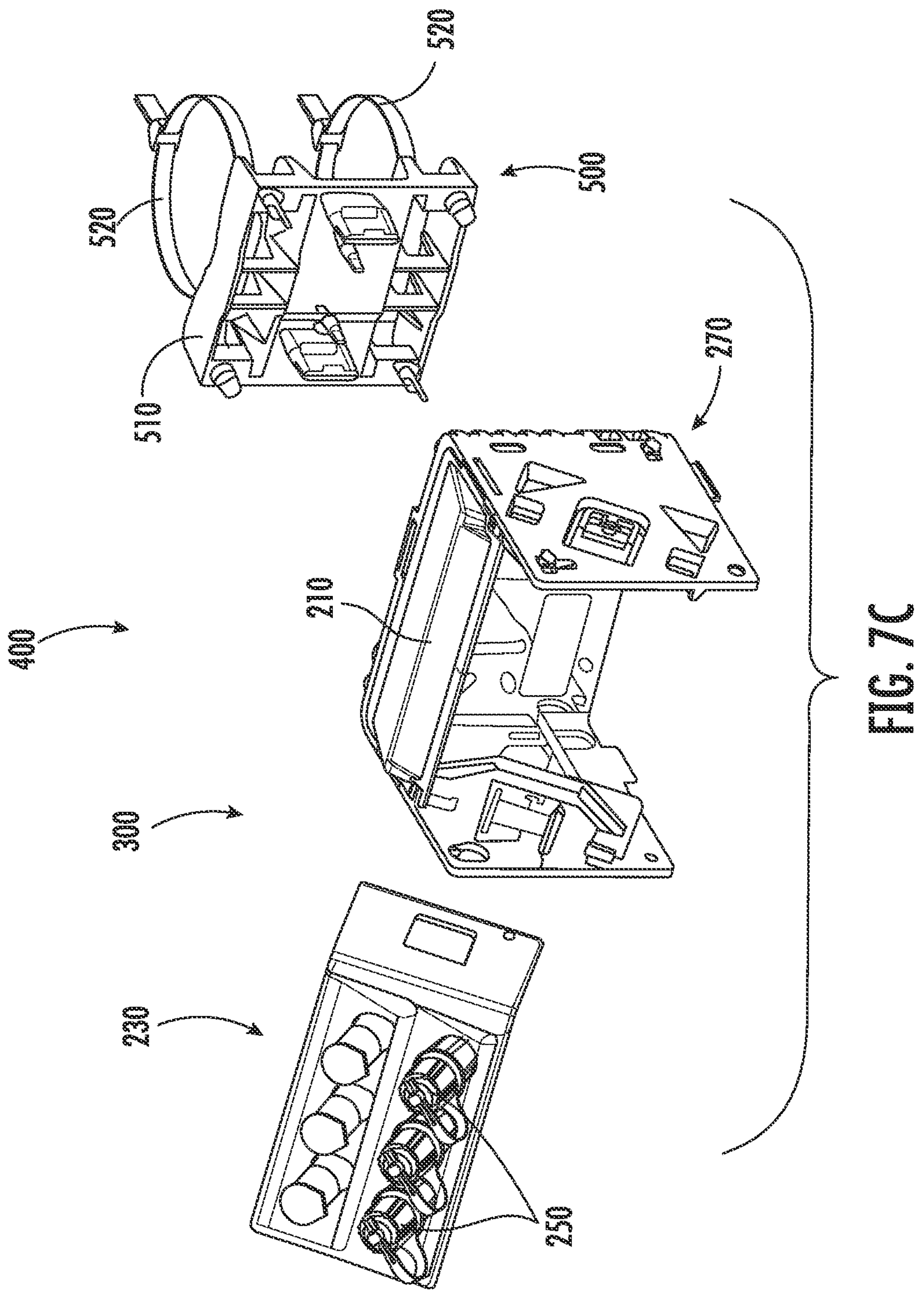
FIG. 7C is an exploded perspective view of the connection interface assembly of FIG. 7A.

Referring now to FIGS. 7A-7C, a connection interface mounting assembly 400 according to embodiments of the present invention is illustrated. The connection interface mounting assembly 400 includes a separate mounting bracket assembly 500 that is configured to mount and secure the connection interface assemblies 200, 300 described herein to a mounting structure 120 (e.g., a mounting pole) (see, e.g., FIGS. 9A-10B). As discussed in further detail below, the mounting bracket assembly 500 provides additional space behind the connection interface assembly 300 (i.e., between the connection interface assembly 300 and the mounting structure 120). The additional space may allow telecommunications equipment to be mounted on the back side of the mounting structure 120.

Figure 8:
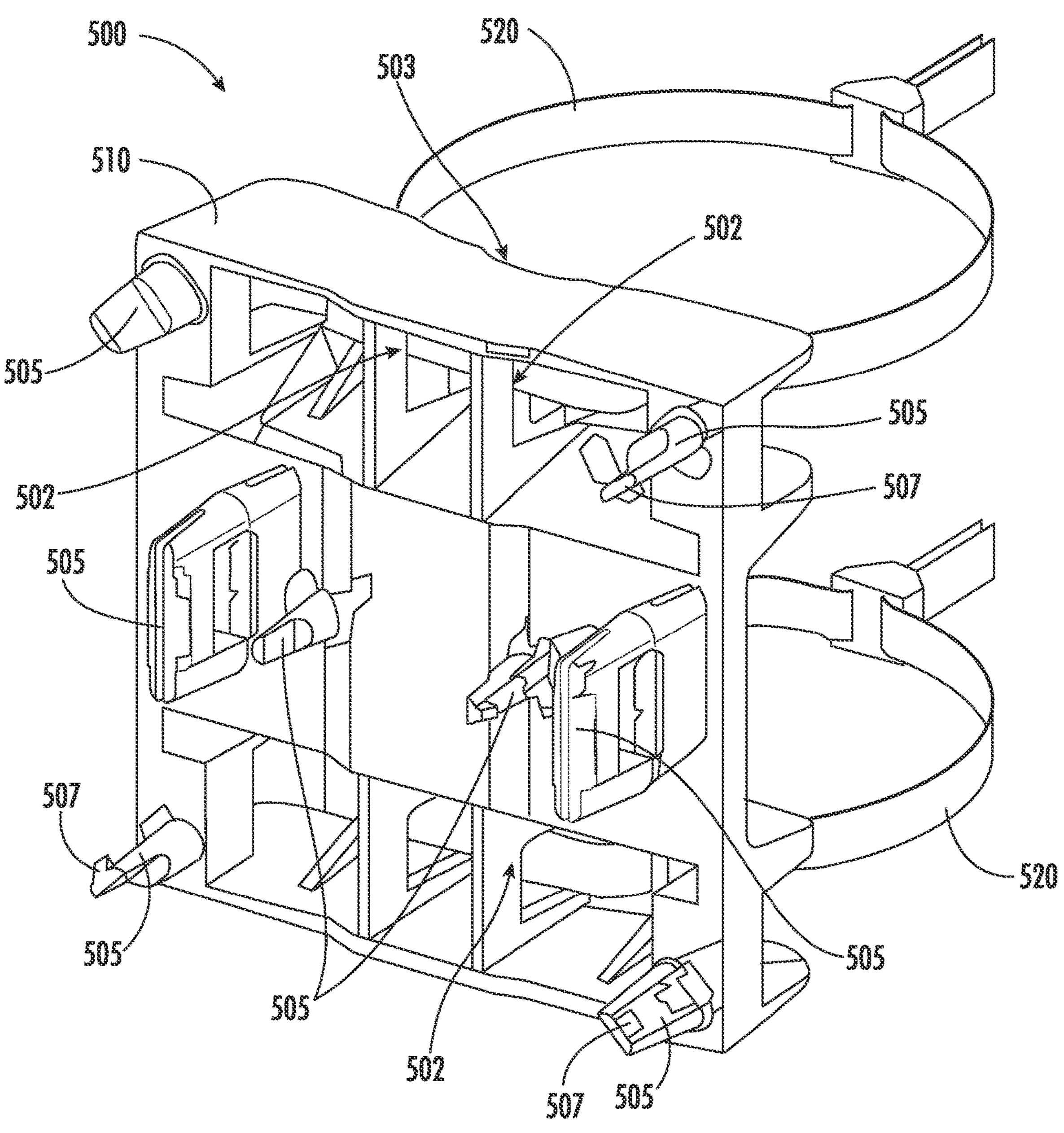
FIG. 8 is a perspective view of the mounting bracket for the connection interface assembly of FIGS. 7A-7C.
Figures 9A, 9B:
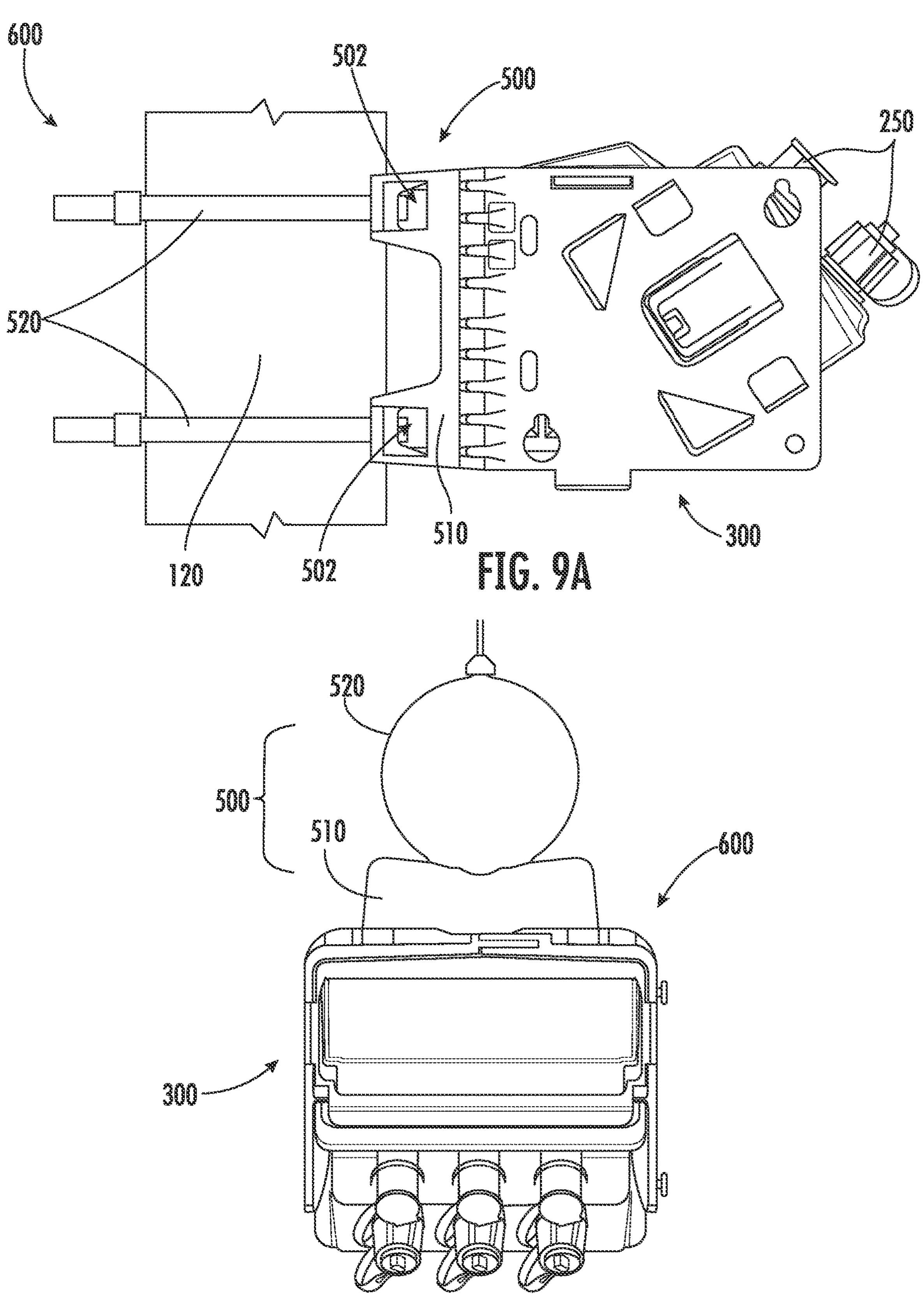
FIG. 9A is a side view of the connection interface assembly of FIGS. 7A-7C secured to a mounting structure according to embodiments of the present invention.
FIG. 9B is a top view of the connection interface assembly of FIG. 9A.

The mounting bracket assembly 500 is illustrated in FIG. 8. As shown in FIG. 8, the mounting bracket assembly 500 includes a main bracket body 510 and one or more attachment mechanisms 520. In some embodiments, the attachment mechanism 520 may include a cable tie, zip tie, or other such wrap-style fastener than can be threaded through apertures 502 in the main bracket body 510 and wrapped around the mounting structure 120 (see, e.g., FIGS. 9A-10B). In other embodiments, the attachment mechanism 520 may include screws, peg-type fasteners, latches, tabs, flanges, or other structures to aid in securing the connection interface assembly 200, 300 to the mounting structure 120.

The main bracket body 510 includes a plurality of protruding members 505 extending outwardly therefrom. The protruding members 505 are each configured to engage a corresponding aperture 276 defined in the back wall 272 of the base module 270 (see, e.g., FIG. 5B and FIG. 5C) to secure the main bracket body 510 to the base module 270. In some embodiments, one or more of the protruding members 505 and apertures 276 may form a snap-fit mechanism, such as the cantilevered latches described herein. For example, as shown in FIG. 8, some of the protruding members 505 may include tapered hooks **505*a*. As the main bracket body 510 and base module 270 are joined together, the protruding members 505 (and hooks 505*a*) are configured to deflect and snap into a respective aperture 276 in the back wall 272 of the base module 270, thereby securing the mounting bracket assembly 500 to the connection interface assembly 200, 300 (i.e., base module 270**).

In some embodiments, the main bracket body 510 may further include one or more recesses 503 configured to receive a portion of the mounting structure 120. The recesses 503 may increase the contact surface area between the mounting bracket assembly 500 and the mounting structure 120, and thus, allowing for a more secure fit against the mounting structure 120. For example, in some embodiments, the recesses 503 may be concave to receive a cylindrical mounting pole 120. However, other shape profiles for the recesses 503 may be used. Similar to the cable connection module 230 and base module 270 described herein, the main bracket body 510 may be formed from a polymeric material, for example, polycarbonate.

Figure 10A:
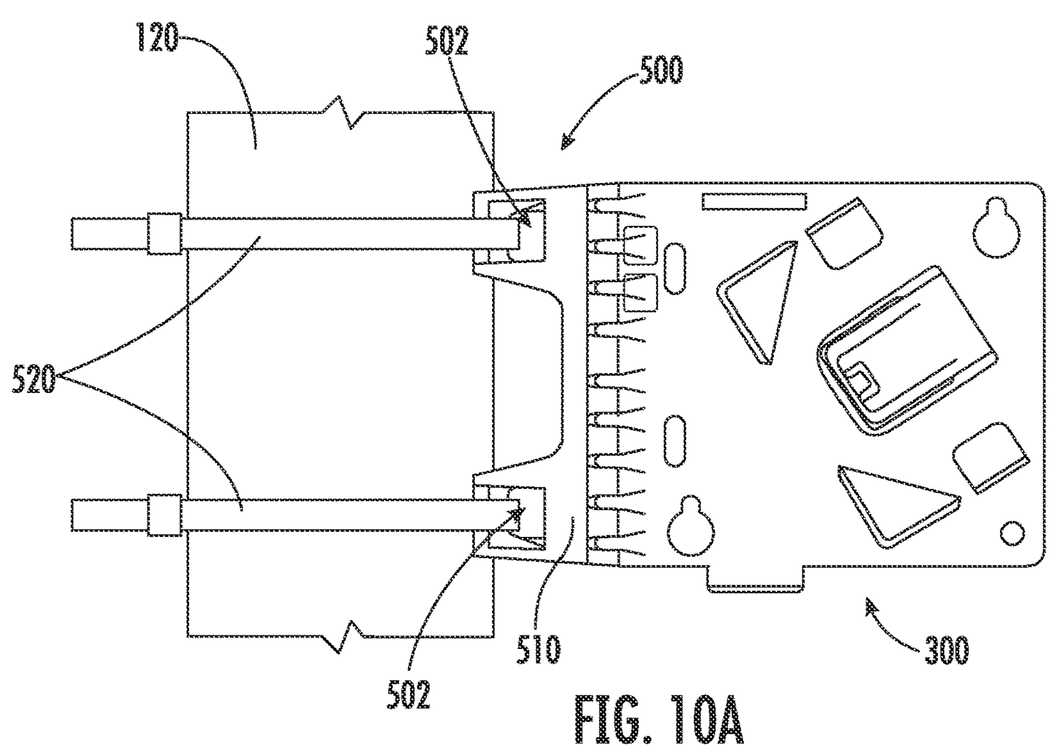
FIG. 10A is a photograph of an exemplary connection interface assembly secured to a mounting structure according to embodiments of the present invention
Figure 10B:
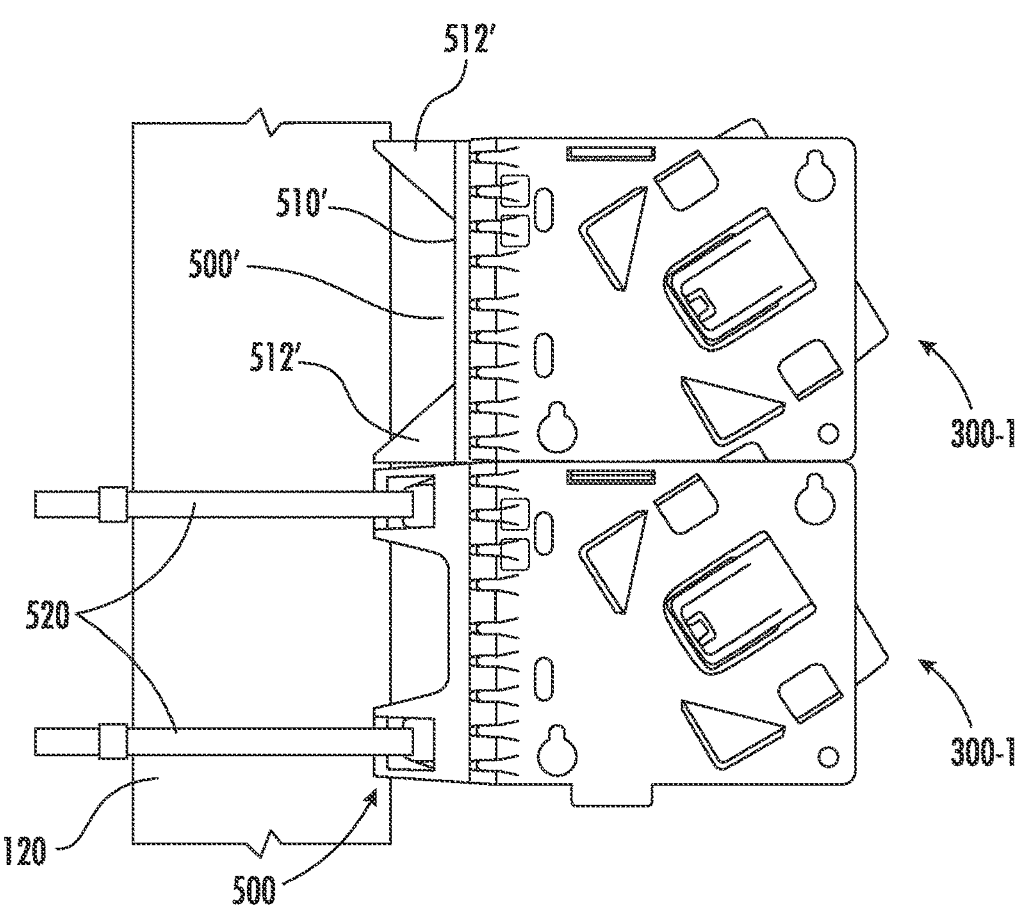
FIG. 10B is a photograph of exemplary connection interface assemblies stacked together and secured to a mounting structure according to embodiments of the present invention.

FIGS. 9A-9B and FIGS. 10A-10B illustrate the mounting bracket assembly 500 securing the connection interface assembly 300 to the mounting structure 120 according to embodiments of the present invention. FIGS. 10A-10B are photographs of an exemplary connection interface assembly 300 secured to a mounting structure 120 utilizing an exemplary mounting bracket assembly 500. FIG. 10A shows a single connection interface assembly 300 secured to a mounting structure 120 according to embodiments of the present invention. In some embodiments, as shown in FIG. 10B, multiple connection interface assemblies 300-1, 300-2 may be stacked together and secured to the mounting structure 120. In some embodiments, the stacked connection interface assemblies 300-1, 300-2 may be secured to the mounting structure 120 by the mounting bracket assembly 500 described herein. In other embodiments, one of the connection interface assembly 300-1 may be secured to the mounting structure 120 utilizing the mounting bracket assembly 500 described herein and the other connection interface assembly 300-2 may contact the mounting structure 120 utilizing a mounting bracket assembly 500' having an alternative main bracket body 510'. As shown in FIG. 10B, in some embodiments, the alternative main bracket body 510' may not include apertures 502 for threading the wrap-style fastener, but instead may include opposing arm members 512' that brace the mounting bracket assembly 500' (and connection interface assembly 300-2) against the mounting structure 120.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A connection interface assembly, the assembly comprising:

a base module having a front and a back, the base module including a back wall defining the back of the base module and first and second opposite side walls that project forwardly from the back wall to a front of the base module, the base module defining a module mounting location between the first and second side walls;

a cable connection module having a main body coupled to or integral with a front wall to which a plurality of cable connection components are mounted, the cable connection module also including first and second opposite side walls that project rearwardly from the front wall, wherein the cable connection module is configured to be inserted into the module mounting location through the front of the base module; and an enclosure, the enclosure comprising a fiber tray and a cover, wherein the cover is configured to engage the cable connection module to form an interior cavity and seal the fiber tray therein.

2. The connection interface assembly according to claim 1, wherein the enclosure further comprises an annular sealing gasket residing between the cover and the cable connection module.

3. The connection interface assembly according to claim 1, wherein the fiber tray includes a bottom and one or more side walls, a front of the fiber tray is open and at least a portion of a rear of the fiber tray has an opening sufficient to allow one or more fiber optic cables from a cable connection component to be routed into the tray.

4. The connection interface assembly according to claim 1, wherein at least a portion of the fiber tray is configured to be slidably received and secured within an interior cavity of the main body.

5. The connection interface assembly according to claim 3, wherein the fiber tray comprises a rail extending outwardly from the bottom, the rail being configured to be received by a corresponding slot along an inner surface of the main body.

6. The connection interface assembly according to claim 1, wherein the fiber tray further comprises one or more cable organizing members.

7. The connection interface assembly according to claim 6, wherein the one or more cable organizing members extend inwardly and generally perpendicularly from the bottom portion of the tray and are positioned such that any excess length of the fiber optic cables within the fiber tray can be wrapped around the cable organizing members.

8. The connection interface assembly according to claim 1, wherein the cover of the enclosure comprises an outer wall that defines an interior cavity, the outer wall having an opening for receiving a cable connection component.

9. The connection interface assembly according to claim 1, wherein a pair of module mounting locations reside between the first and second side walls for receiving the cable connection module.

10. The connection interface assembly according to claim 1, wherein the module mounting location includes one or more flexible fingers configured to snap into an aperture defined in each side wall of the cable connection module as the cable connection module is inserted into the base module.

11. The connection interface assembly according to claim 1, wherein the side walls of the base module include first and second receptacles at the module mounting location for respectively receiving the side walls of the cable connection module.

12. The connection interface assembly according to claim 11, wherein the first and second receptacles are bounded by guide walls that protrude inwardly from the side walls of the base module.

13. The connection interface assembly according to claim 1, further comprising a top cover configured to engage the cable connection module and/or the base module.

14. The connection interface assembly according to claim 13, wherein a front edge of the top cover may be angled upwardly to define a lip or flanged edge, the flanged front edge being configured to engage a corresponding edge or lip residing along a top inner surface of the cable connection module.

15. The connection interface assembly according to claim 6, wherein each cable organizing member comprises an arm member extending outwardly therefrom, the respective arm members configured to hold an excess length of the fiber optic cables when wrapped around the cable organizing members within the tray.

16. The connection interface assembly according to claim 1, further comprising one or more are members extending inwardly from the one or more side walls, the one or more arm members configured to hold an excess length of the fiber optic cables within the tray.

17. The connection interface assembly according to claim 1, wherein the cover is secured to the main body via one or more securing features comprising a snap-fit mechanism.

18. The connection interface assembly according to claim 1, wherein a pair of module mounting locations reside between the first and second side walls for receiving the cable connection module.

19. The connection interface assembly according to claim 1, wherein the base module, the cable connection module, and/or the enclosure are formed from a polymeric material.

* * * * *